United States Patent
Nakano et al.

(10) Patent No.: US 11,685,454 B2
(45) Date of Patent: Jun. 27, 2023

(54) DOOR ATTACHMENT METHOD, AND DOOR MOVING DEVICE AND SAGGING MEASUREMENT DEVICE USED THEREFOR

(71) Applicant: MAZDA MOTOR CORPORATION, Hiroshima (JP)

(72) Inventors: Naoki Nakano, Hiroshima (JP); Yusuke Nakabayashi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 176 days.

(21) Appl. No.: 17/432,811

(22) PCT Filed: Feb. 14, 2020

(86) PCT No.: PCT/JP2020/005852
§ 371 (c)(1),
(2) Date: Aug. 20, 2021

(87) PCT Pub. No.: WO2020/170979
PCT Pub. Date: Aug. 27, 2020

(65) Prior Publication Data
US 2022/0119057 A1    Apr. 21, 2022

(30) Foreign Application Priority Data
Feb. 22, 2019   (JP) .................................. 2019-030857

(51) Int. Cl.
*B62D 65/06*        (2006.01)
*G01B 21/24*        (2006.01)
(52) U.S. Cl.
CPC ............. *B62D 65/06* (2013.01); *G01B 21/24* (2013.01)

(58) Field of Classification Search
CPC ...... B62D 65/06; B62D 65/028; G01B 21/24; G01B 5/0002; G01B 5/025; G01B 11/002; G01B 11/022; G01B 11/26
See application file for complete search history.

(56) References Cited

U.S. PATENT DOCUMENTS 5,181,307 A * 1/1993 Kitahama .............. B62D 65/06
29/434
5,203,811 A * 4/1993 Hirotani ................. B62D 65/06
29/434
(Continued)

FOREIGN PATENT DOCUMENTS

GB       2242168 A  *  9/1991 ............. B62D 65/06
JP     H02258484 A  * 10/1990 ............. B62D 65/00
(Continued)

OTHER PUBLICATIONS

International Search Report issued in PCT/JP2020/005852; dated May 12, 2020.

*Primary Examiner* — Bayan Salone
(74) *Attorney, Agent, or Firm* — Studebaker & Brackett PC

(57) ABSTRACT

A door attachment method assembles a door with a high degree of accuracy. Embodiments include a primary fastening step of bolting hinges to attachment surfaces of a vehicle body; a door panel position measurement step of measuring a relative position of a door panel in an opening when a door is brought into a cantilevered state and the hinges are fastened; a loosening step of loosening the fastening; a door position correction step of moving the door within the attachment surfaces based on a measurement result in the door panel position measurement step; and a secondary fastening step of re-fastening the hinges to the attachment surfaces. Throughout the primary fastening step, the door panel position measurement step, the loosening step, the (Continued)

door position correction step, and the secondary fastening step, a state where clamps respectively grip the hinges to cause the hinges to abut the attachment surfaces is maintained.

17 Claims, 13 Drawing Sheets

(56) References Cited

U.S. PATENT DOCUMENTS

| | | | | |
|---|---|---|---|---|
| 6,311,382 | B1* | 11/2001 | Jack | B62D 65/06 |
| | | | | 33/783 |
| 2006/0107507 | A1* | 5/2006 | Brose | B25J 9/1684 |
| | | | | 29/407.05 |

FOREIGN PATENT DOCUMENTS

| | | | | | |
|---|---|---|---|---|---|
| JP | H03239685 | A | * | 10/1991 | ............. B62D 65/06 |
| JP | H0453638 | A | * | 2/1992 | ............. B23P 21/00 |
| JP | H0664573 | A | * | 3/1994 | ............. B23P 21/00 |
| JP | 2002-068038 | A | | 3/2002 | |
| JP | 2002068038 | A | * | 3/2002 | ............. B62D 25/04 |
| JP | 2005537989 | A | * | 12/2005 | ............ B25J 9/1684 |
| JP | 2010208526 | A | * | 9/2010 | |

\* cited by examiner

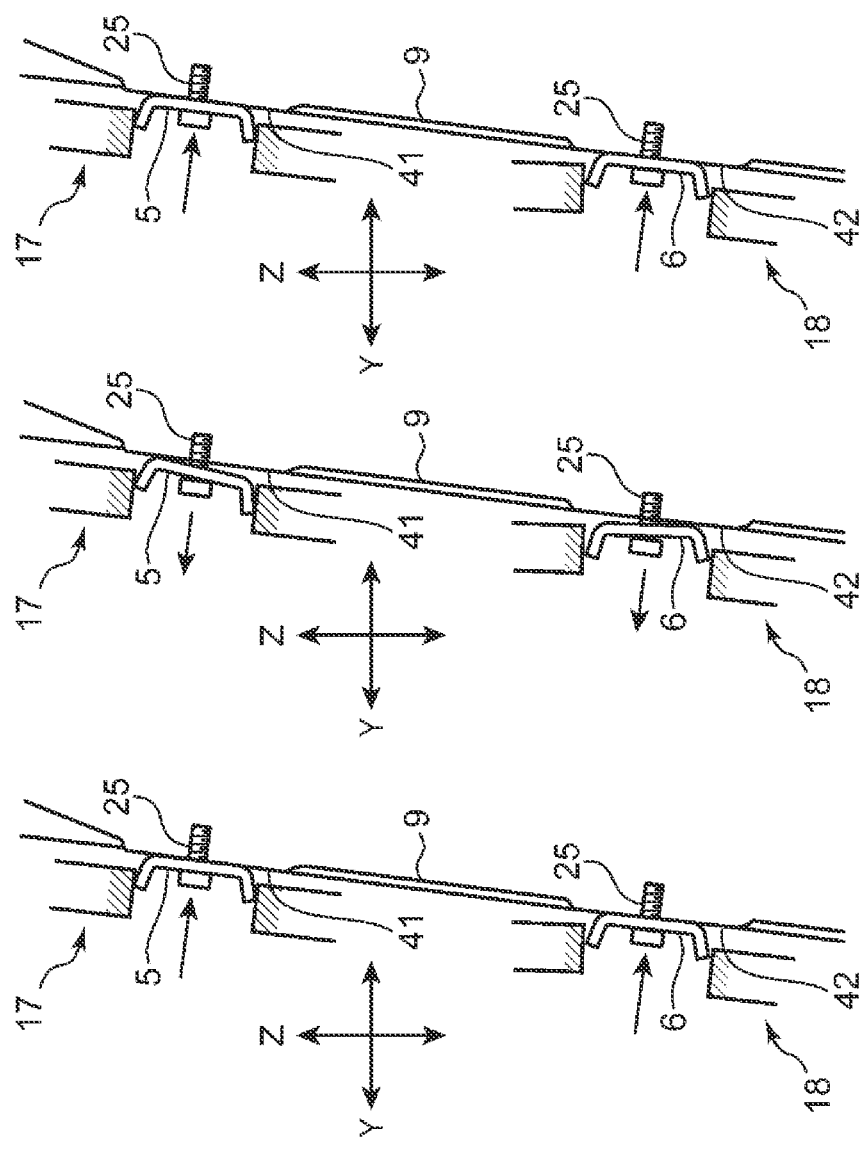

DOOR ATTACHMENT METHOD, AND DOOR MOVING DEVICE AND SAGGING MEASUREMENT DEVICE USED THEREFOR

TECHNICAL FIELD

The present disclosure relates to a door attachment method for automatically attaching a hinged door, and to a door moving device and a measurement device for measuring sag of a door under its own weight used therefor.

BACKGROUND ART

Conventionally, various methods for automatically attaching a vehicle door to a vehicle body have been proposed. For example, in a door attachment method disclosed in Japanese Patent Document JP-A-2002-68038, first, as a preparation stage, a step of preparing a door hinge having a hinge arm on the vehicle body side and a hinge arm on the door side is performed. Next, a step of attaching a door hinge assembly jig having hinge positioning keeping means to the vehicle body is performed. Then, a step of holding the hinge arm on the vehicle body side by the hinge positioning keeping means is performed.

After the above preparation stage, an attachment position of the hinge arm on the door side in a door panel is determined. In a temporary door joining step, a position of the hinge positioning keeping means, which is set at a specified position in the vehicle body, is adjusted in anticipation of an inclination caused by the weight of the rigged door panel. Then, a process of attaching the hinge arm on the vehicle body side, which is held by this hinge positioning keeping means, in the door hinge to the vehicle body is performed. Thereafter, the door panel is attached to the hinge arm on the door side, and the attachment of the door is thereby completed.

In the above door attachment method, in a temporary door joining step, a position of the door hinge assembly jig, which is set at a specified position in the vehicle body, is adjusted in anticipation of an inclination caused by the weight of a rigged door panel. However, in the actual door assembly, a variation in component accuracy and an assembly error in each portion of the door panel, the hinge, and the vehicle body differ from one vehicle to another. For this reason, there is a case where the actual inclination, which is caused by the weight of the door panel, after completion of the door attachment differs from the initially anticipated inclination. Thus, there is room for improvement in assembly of the hinged door to the vehicle body to achieve a high degree of accuracy.

SUMMARY

The present disclosure has been made in view of the above circumstance and therefore has a purpose of providing a door attachment method that enables door attachment with a high degree of accuracy.

In order to solve the above problem, the door attachment method according to the present disclosure is a door attachment method for attaching a door having a door panel and a hinge to an opening of an attachment target in a freely openable/closable manner, and includes a primary fastening step of fastening the hinge to a specified attachment surface of the attachment target with a specified magnitude of torque by a fastening mechanism using a fastening member in a state where a door panel holding mechanism holds the door panel to arrange the door at a target position at which the door panel closes the opening and a grip mechanism grips the hinge; a door panel position measurement step of discontinuing holding of the door panel while the grip mechanism keeps gripping the hinge so as to bring the door into a cantilevered state, and measuring a relative position of the door panel in the opening in a state where the hinge is primarily fastened; a loosening step of loosening fastening of the fastening member by the fastening mechanism; a door position correction step of moving the door within the attachment surface by a door moving device on the basis of a measurement result in the door panel position measurement step, so as to correct a position of the door; and a secondary fastening step of fastening the hinge again to the attachment surface with the specified magnitude of torque by the fastening mechanism using the fastening member. In a series of the primary fastening step, the door panel position measurement step, the loosening step, the door position correction step, and the secondary fastening step, a state where the grip mechanism grips the hinge to cause the hinge to abut the attachment surface is maintained.

BRIEF DESCRIPTION OF THE DRAWINGS

FIGS. 4A-4B are explanatory views in which FIG. 4A illustrates a state before hinges of the rear door come in close contact with rear hinge attachment surfaces of a B pillar in the vehicle body illustrated in FIG. 2, and FIG. 4B illustrates a state after the hinges of the rear door are in close contact with the rear hinge attachment surfaces.

FIGS. 5A-5D are schematic explanatory views for illustrating a basic principle of the door attachment method of the present disclosure, in which FIG. 5A is an explanatory view illustrating a state where the hinge that is gripped by a grip mechanism abuts the hinge attachment surface, FIG. 5B is an explanatory view illustrating a state where the gripped hinge is primarily fastened, FIG. 5C is an explanatory view illustrating a state where a bolt is loosened while the hinge keeps being gripped, and FIG. 5D is an explanatory view of a state where the gripped hinge is secondarily fastened.

DETAILED DESCRIPTION

A detailed description will hereinafter be made of a preferred embodiment of the present disclosure with reference to the accompanying drawings. In the following embodiment, a representative embodiment will be exemplified. However, the embodiment may appropriately be modified within the scope that does not depart from the scope of the present disclosure.

Figure 1:
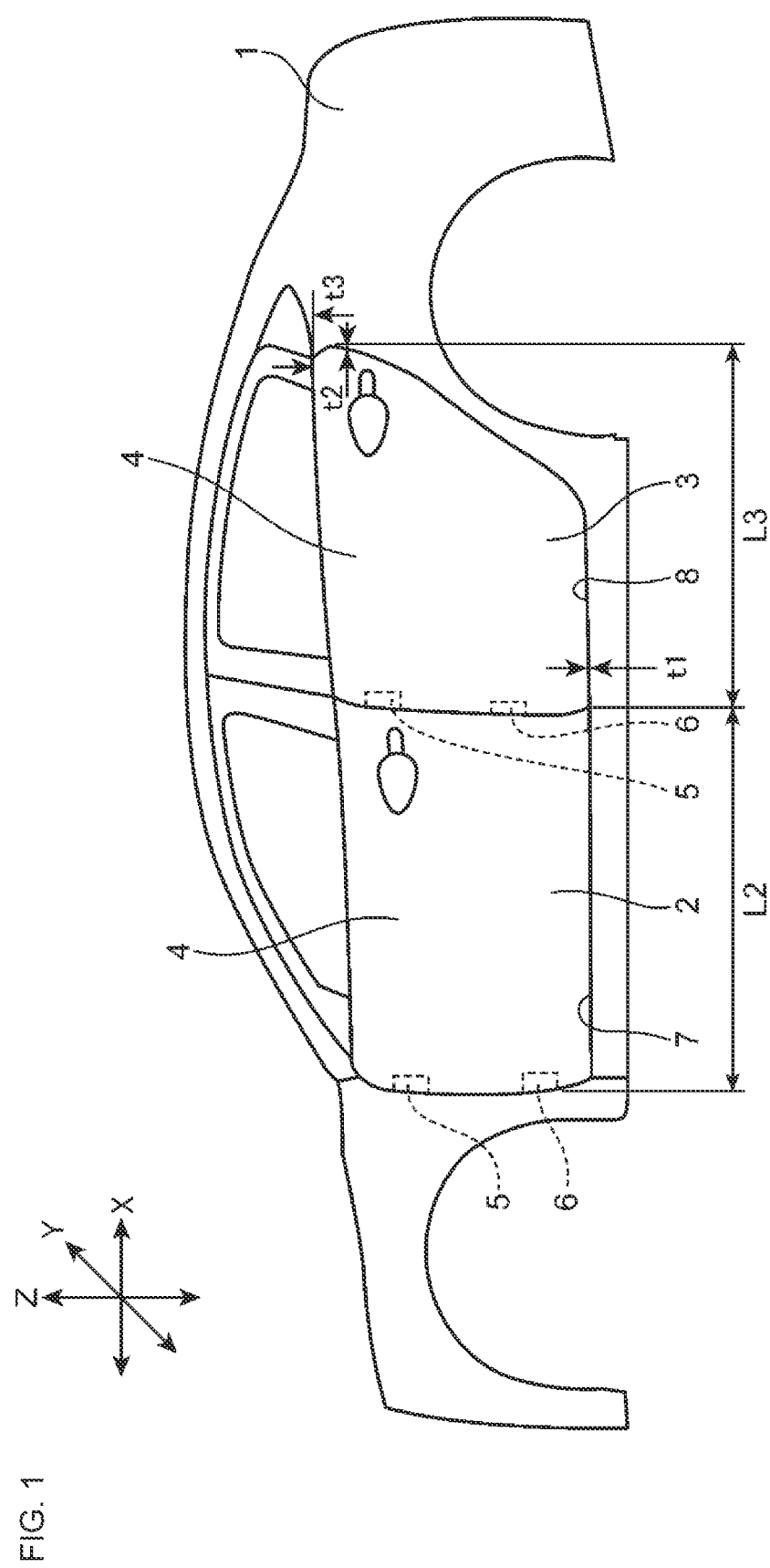
FIG. 1 is a side view illustrating a vehicle body in a state where a front door and a rear door are attached thereto by a door attachment method according to an embodiment of the present disclosure.

The door attachment method according to the present disclosure relates to a door attachment method for attaching a door having a door panel and a hinge; that is, a hinged door, to an opening of an attachment target in a freely openable/closable manner. Hereinafter, as an exemplary embodiment of the door attachment method of the present disclosure, a description will be made of an embodiment in which a front door 2 and a rear door 3 are respectively attached to two openings 7, 8 that are aligned in a longitudinal direction X (a specified direction) of a vehicle body 1 of an automobile illustrated in FIGS. 1 to 3 as the attachment target.

The front door 2 and the rear door 3, which are attached to the vehicle body 1, each include a door panel 4 and a pair of hinges 5, 6 provided at a front end of the door panel 4. The hinges 5, 6 are arranged to be separated in a vertical direction Z of the vehicle body 1.

Figure 7:
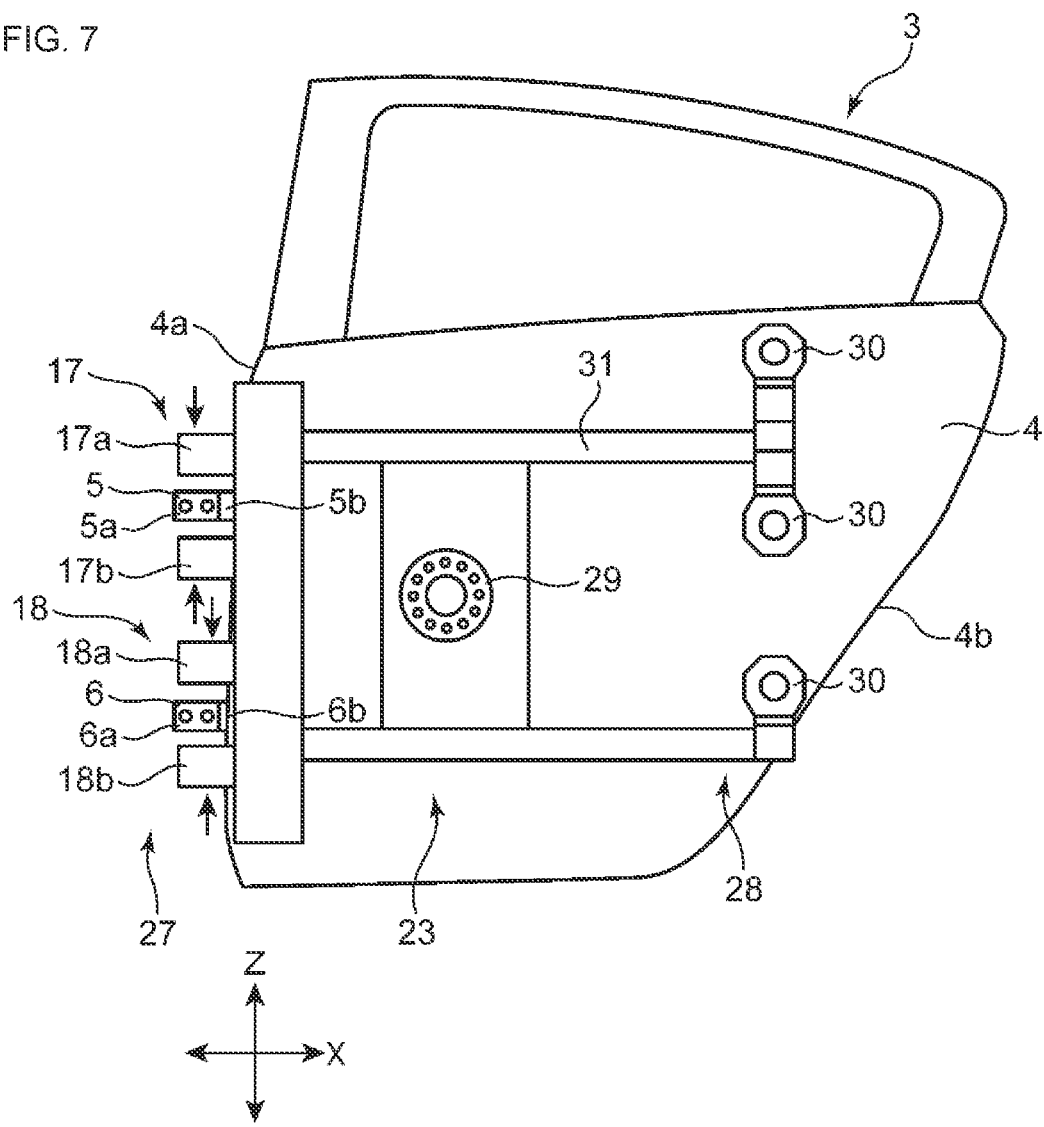
FIG. 7 is a view illustrating a state where the grip mechanism and a door panel holding mechanism in a door transportation attachment in FIG. 6 hold the door, and is a view in which the door transportation attachment is seen from a robot hand side.

The hinges 5, 6 each have a hinge structure. More specifically, as illustrated in FIG. 7, the hinges 5, 6 respectively include: vehicle body-side portions 5a, 6a that are attached to the vehicle body 1; door-side portions 5b, 6b that are fixed to the door panel 4 in advance; and shaft portions (not illustrated) that couple the door-side portions 5b, 6b in a swingable manner to the vehicle body-side portions 5a, 6a.

In the vehicle body 1, in a front edge of the front opening 7 (more specifically, a surface facing a width direction Y of the vehicle body 1 in such an edge), hinge attachment surfaces 11, 12, to which the hinges 5, 6 of the front door 2 are respectively attached, are provided to be separated in the vertical direction Z of the vehicle body 1. Furthermore, at least one each (for example, two each) of fastening holes 13, 14 is formed in respective one of the hinge attachment surfaces 11, 12 in order to fasten a bolt as a fastening member thereto. Similarly, in a B pillar 9 (more specifically, a surface facing the width direction Y of the vehicle body 1 in the B pillar 9) that is arranged in front of the rear opening 8, hinge attachment surfaces 41, 42, to which the hinges 5, 6 of the rear door 3 are respectively attached are provided to be separated in the vertical direction Z. Furthermore, at least one each (for example, two each) of fastening holes 43, 44 is formed in a respective one of the hinge attachment surfaces 41, 42. Here, the B pillar 9 is a center pillar that extends in the vertical direction Z at a position between the front opening 7 and the rear opening 8.

One each of machining reference holes 15, 45 is formed at a position near a respective one of the front fastening hole 13 and the rear fastening hole 44. The machining reference holes 15, 45 are used in a vehicle body length measurement step (S3) and a vehicle body displacement measurement step (S4), which will be described below.

In a state where the hinges 5, 6 of the front door 2 respectively abut the hinge attachment surfaces 11, 12 provided to the front edge of the front opening 7 of the vehicle body 1, bolts 25 (see FIGS. 5A-D) are fastened to the fastening holes 13, 14, and the vehicle body-side portions 5a, 6a (see FIG. 7) of the hinges 5, 6 are thereby attached to the hinge attachment surfaces 11, 12, respectively. Similarly, in a state where the hinges 5, 6 of the rear door 3 respectively abut the hinge attachment surfaces 41, 42 provided in the B pillar 9 in front of the rear opening 8, the bolts 25 (see FIGS. 5A-D) are fastened to the fastening holes 43, 44, and the vehicle body-side portions 5a, 6a of the hinges 5, 6 are thereby attached to the hinge attachment surfaces 41, 42, respectively.

Figure 4A:
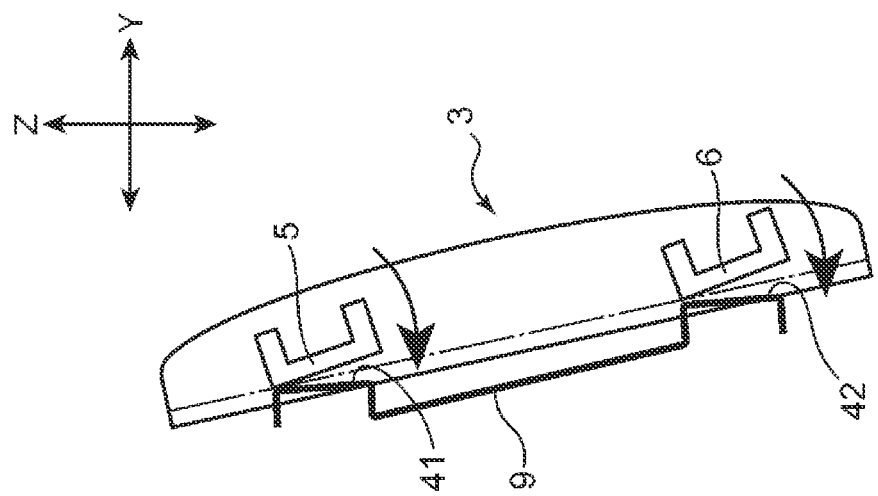
Figure 4B:
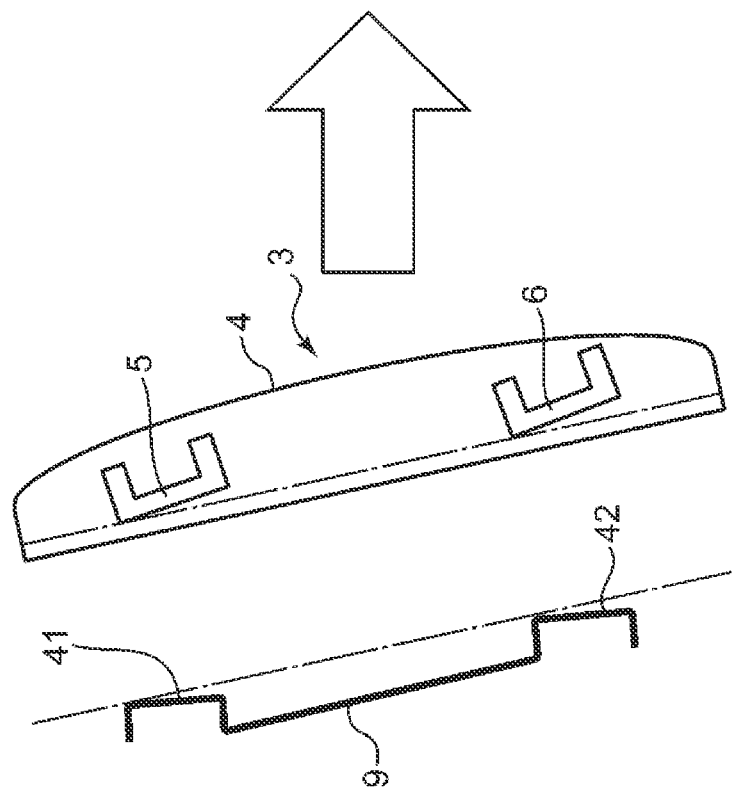

By using the rear door 3 as an example, a description will herein be made of a reason why assembly accuracy of the door 3 by the door attachment method in this embodiment is degraded with reference to FIGS. 4A and 4B.

Due to variations in machining accuracy of the hinges 5, 6, assembly accuracy of the hinges 5, 6 to the door panel 4, and the like, in regard to the actual hinges 5, 6 (more specifically, the vehicle body-side portions 5a, 6a of the hinges 5, 6), not only surfaces of the hinges 5, 6 that respectively oppose the attachment surfaces 41, 42 on the vehicle body side (more specifically, the B pillar 9 side) are not level, but also orientations of the surfaces of the hinges 5, 6 slightly differ from each other. Accordingly, in the case where the hinges 5, 6 are respectively fastened to the attachment surfaces 41, 42 of the B pillar 9 by the bolts 25 (see FIG. 5) so as to forcedly bring the surfaces of the hinges 5, 6 into close contact (surface contact) with the attachment surfaces 41, 42, the hinges 5, 6 slightly move in a direction to eliminate variations in minute clearances produced between the hinges 5, 6 and the attachment surfaces 41, 42. As a result, the entire door panel 4 is distorted, which significantly changes a shape of the door panel 4 (particularly, a shape of an outer surface of the door panel 4). This degrades the assembly accuracy of the door 3. A change amount and a change direction of the door panel 4 at this time are inconsistent and vary by the vehicle body 1 and the doors 2, 3. Thus, it is difficult to set attachment positions of the hinges 5, 6 in advance in anticipation of the distortion of the door panel 4.

In addition, as described in JP-A-2002-68038 discussed above, even in the case where the attachment positions of the hinges 5, 6 are adjusted in advance prior to bolt fastening in anticipation of an inclination caused by the weight of the door panel, in actual door assembly, a variation in component accuracy and an assembly error in each portion of the door panel, the hinge, and the vehicle body differs by vehicles. Thus, it is impossible to assemble the hinged door with a high degree of accuracy.

In view of the above, as a result of earnest study on the door attachment method that would improve the assembly accuracy of the door, it was determined that the vehicle body 1 (more specifically, the B pillar 9 in FIG. 4) was more rigid than the door panel 4, and the vehicle body 1 (the B pillar 9) was hardly deformed at the time of bolt fastening. Then, it was found that the assembly accuracy of the door could be improved when, as illustrated in FIG. 5, a state where clamps 17, 18 as grip mechanisms respectively grip the hinges 5, 6 to cause the hinges 5, 6 to respectively abut the attachment surfaces 41, 42 was maintained with the attachment surfaces 41, 42 of the vehicle body 1 (the B pillar 9) being reference surfaces for the attachment of the hinges 5, 6. Meanwhile, the bolts 25 were fastened with a specified magnitude of torque (primary fastening), a position of the door panel 4 in the fastened state was measured, the bolts 25 were once loosened after the measurement to correct a position of the door to a target position, and thereafter the bolts 25 were fastened again with the same specified magnitude of torque (secondary fastening).

That is, in the door attachment method of the present disclosure, in order to improve the assembly accuracy of the door, as illustrated in FIGS. 5A-5D, grip arms 17a, 17b, 18a, 18b of the clamps 17, 18 as the grip mechanisms grip the hinges 5, 6 in the vertical direction Z in advance, and the state where the hinges 5, 6 respectively abut the attachment surfaces 41, 42 of the vehicle body 1 is maintained (a state in FIG. 5A). Then, while maintaining such a state, a primary fastening step by the bolts 25 (see FIG. 5B), a loosening step of loosening the bolts 25 (see FIG. 5C), a step of correcting the position of the door by moving the door along the attachment surfaces 41, 42 in the state where the bolts 25 are loosened (not illustrated), and a secondary fastening step by the bolts 25 (see FIG. 5D) are performed.

Furthermore, specifically, the door attachment method in this embodiment is a door attachment method for respectively attaching the doors 2, 3, each of which has the door panel 4 and the hinges 5, 6, to the openings 7, 8 of the vehicle body 1 in a freely openable/closable manner, and includes, as main steps of the method, the following steps (I) to (V):
(I) the primary fastening step of fastening the hinges 5, 6 to the specified attachment surfaces 11, 12, 41, 42 (see FIG. 2) of the vehicle body 1 with the specified magnitude of torque by a fastening robot 24 (see FIG. 6) as a fastening mechanism using the bolts 25 in a state where a door panel holding mechanism 28 (see FIG. 7) holds the door panel 4 to arrange each of the doors 2, 3 at the target position, at which the door panel 4 closes respective one of the openings 7, 8, and the clamps 17, 18 of a grip mechanism 27 respectively hold the hinges 5, 6 (see FIG. 5 and FIG. 7);
(II) a door panel position measurement step of discontinuing holding of the door panel 4 while the clamps 17, 18 of the grip mechanism 27 keep gripping the hinges 5, 6, respectively, so as to bring each of the doors 2, 3 into a cantilevered state and measuring a relative position of the door panel 4 in each of the openings 7, 8 in a state where the hinges 5, 6 are primarily fastened;
(III) the loosening step of loosening fastening of the bolts 25 by the fastening robot 24;
(IV) a door position correction step of correcting the positions of the doors 2, 3 by moving the doors 2, 3 within the attachment surfaces 11, 12, 41, 42 by a door moving device 21 (see FIG. 6) on the basis of the measurement result in the door panel position measurement step; and
(V) the secondary fastening step of fastening the hinges 5, 6 to the attachment surfaces 11, 12, 41, 42 again by the fastening robot 24 that uses the bolts 25 with the specified magnitude of torque.

In a series of the primary fastening step, the door panel position measurement step, the loosening step, the door position correction step, and the secondary fastening step described above, the state where the clamps 17, 18 of the grip mechanism 27 respectively grip the hinges 5, 6 to cause the hinges 5, 6 to abut the attachment surfaces 11, 12, 41, 42 is maintained.

In the above door attachment method, as illustrated in FIGS. 5A to 5D, the state where the clamps 17, 18 of the grip mechanism 27 respectively grip the hinges 5, 6 to cause the hinges 5, 6 to respectively abut the attachment surfaces 41, 42 is maintained. In this way, the state where the hinges 5, 6 respectively abut the attachment surfaces 41, 42 (that is, a state where a distance between each of the hinges 5, 6 and respective one of the attachment surfaces 41, 42 is zero) is not changed during primary fastening (FIG. 5B) and during secondary fastening (FIG. 5D). Thus, even in the case where the bolts 25 are loosened after the primary fastening (FIG. 5C) to correct the position of the door, and the secondary fastening is performed thereafter, it is possible to secure reproducibility to reproduce the same deflection as deflection of the door in the primarily fastened state, that is, twice-fastening reproducibility with the attachment surfaces 41, 42 being the reference surfaces. As a result, the door can be assembled with a high degree of accuracy.

Such twice-fastening reproducibility is secured as long as the state where the clamps 17, 18 of the grip mechanism 27 respectively grip the hinges 5, 6 to cause the hinges 5, 6 to abut the attachment surfaces 41, 42 is maintained. Meanwhile, once gripping of the hinges 5, 6 by the clamps 17, 18 is discontinued once (for example, discontinued after the primary fastening or after the loosening step), a positional relationship between the hinges 5, 6 and the attachment surfaces 41, 42 in the width direction Y is changed. Thus, the twice-fastening reproducibility is no longer secured.

The twice-fastening reproducibility applies to the case of the attachment of each of the front door 2 and the rear door 3.

Next, a further specific description will be made on the door moving device 21 used in the door attachment method according to the embodiment.

Figure 6:
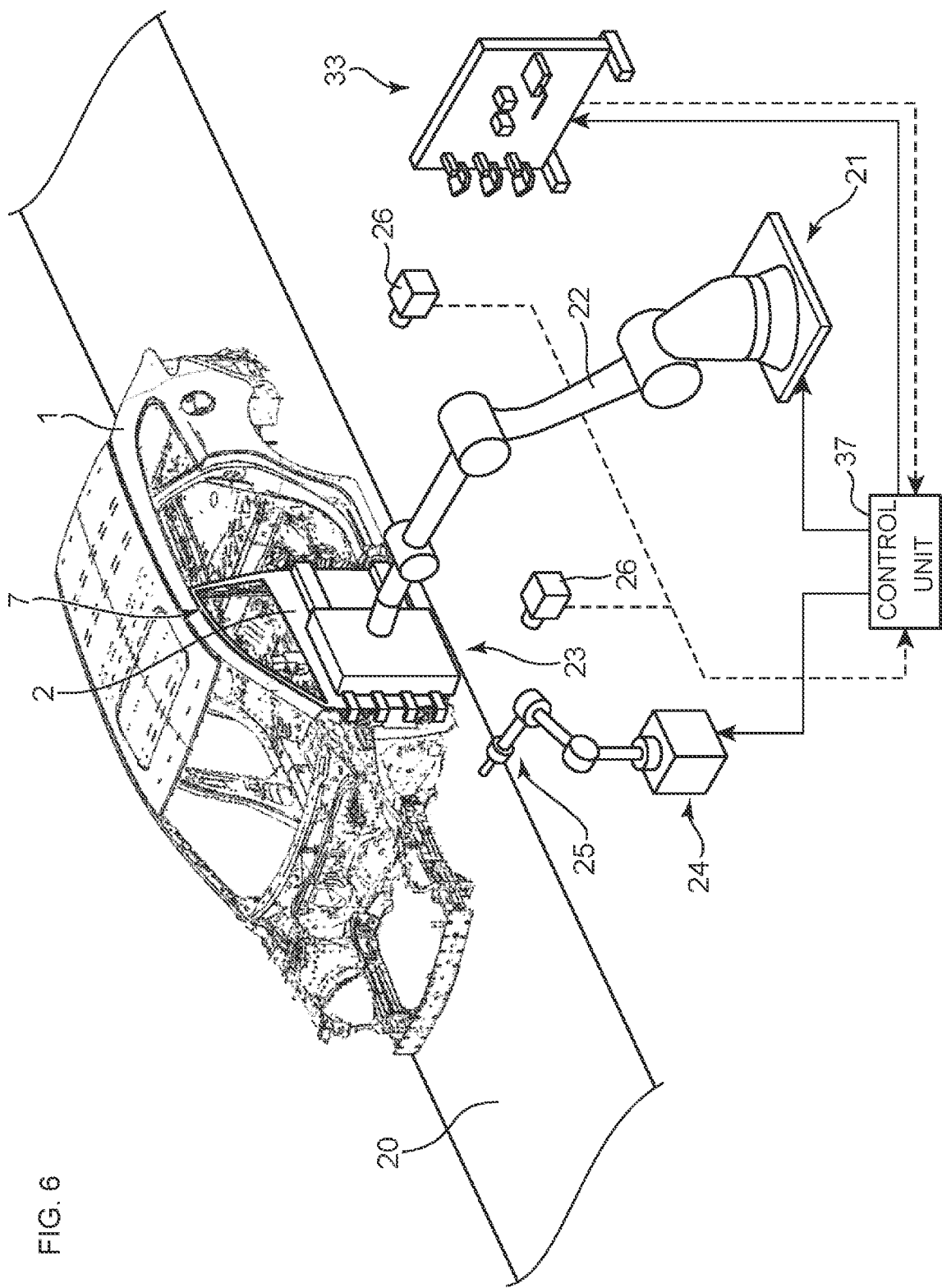
FIG. 6 is an explanatory view illustrating the embodiment of the door attachment method of the present disclosure, and is an explanatory view illustrating operation to attach the front door to the vehicle body in FIG. 1 by using a door moving device and a fastening mechanism according to the embodiment of the present disclosure.

As illustrated in FIG. 6, the door moving device 21 and the fastening robot 24 are installed near a transportation conveyor 20 that transports the vehicle body 1, and operation thereof is controlled by a control unit 37.

The door moving device 21 includes: a door transportation attachment 23 (commonly called material handling or material handling equipment) that separately holds one of the door 2 or 3; and a robot hand 22 as a moving mechanism that moves the door transport attachment 23 with the door 2 or 3.

More specifically, as illustrated in FIG. 7, the door transportation attachment 23 includes: the grip mechanism 27 having the clamps 17, 18 that respectively grip the hinges 5, 6 of the door 2 or 3; the door panel holding mechanism 28 that holds the door panel 4 for the door 2 or 3; a robot hand connection section 29 that is connected to a tip portion of the robot hand 22; and a frame 31. The grip mechanism 27, the door panel holding mechanism 28, and the robot hand connection section 29 are fixed to the frame 31, and the door transportation attachment 23 is thereby constructed as a single assembly.

The grip mechanism 27 includes: the clamps 17, 18 that respectively hold the hinges 5, 6 in the vertical direction Z; and a clamp drive section (not illustrated) that drives these clamps 17, 18.

The clamps 17, 18 are arranged at positions that correspond to positions of the hinges 5, 6, respectively, and are separated in the vertical direction Z. The clamp 17 has a pair of grip arms 17a, 17b that are freely openable/closable in the vertical direction Z and that can hold the upper hinge 5 therebetween. The clamp 18 has a pair of grip arms 18a, 18b that are freely openable/closable in the vertical direction Z and that can hold the lower hinge 6 therebetween.

The grip mechanism 27 in this embodiment is configured to be able to change the positions at which the clamps 17, 18 respectively hold the hinges 5, 6 so as to correspond to plural types of the doors 2, 3 with the different attachment positions of the hinges 5, 6 to the door panel 4. The door panel holding mechanism 28 has a sticking unit 30 that sticks to the outer surface of the door panel 4.

In order to stably hold the door panel 4, the sticking unit 30 is arranged to stick to a portion near a side edge 4b on an opposite side from a side edge 4a, to which the hinges 5, 6 are attached, in the door panel 4. Further more specifically, a plurality of the sticking units 30 are aligned along the side edge 4b on the opposite side so as to be able to disperse and receive weight of the door panel 4.

Each of the sticking units 30 has a sticking pad that can stick in vacuum to the outer surface of the door panel 4. The sticking pad is preferably manufactured from relatively hard synthetic rubber such as urethane rubber in order to suppress displacement of the door panel 4 in a stuck state.

In addition, the frame 31 is preferably configured to be able to change the attachment position of the sticking unit 30 in the longitudinal direction X. In such a case, the sticking unit 30 sticks at the position corresponding to the plural types of the doors 2, 3 with the door panels 4 in the different shapes and sizes. In this way, the sticking unit 30 can stick to the door panel 4 of each of the plural types of the doors 2, 3.

Figure 8:
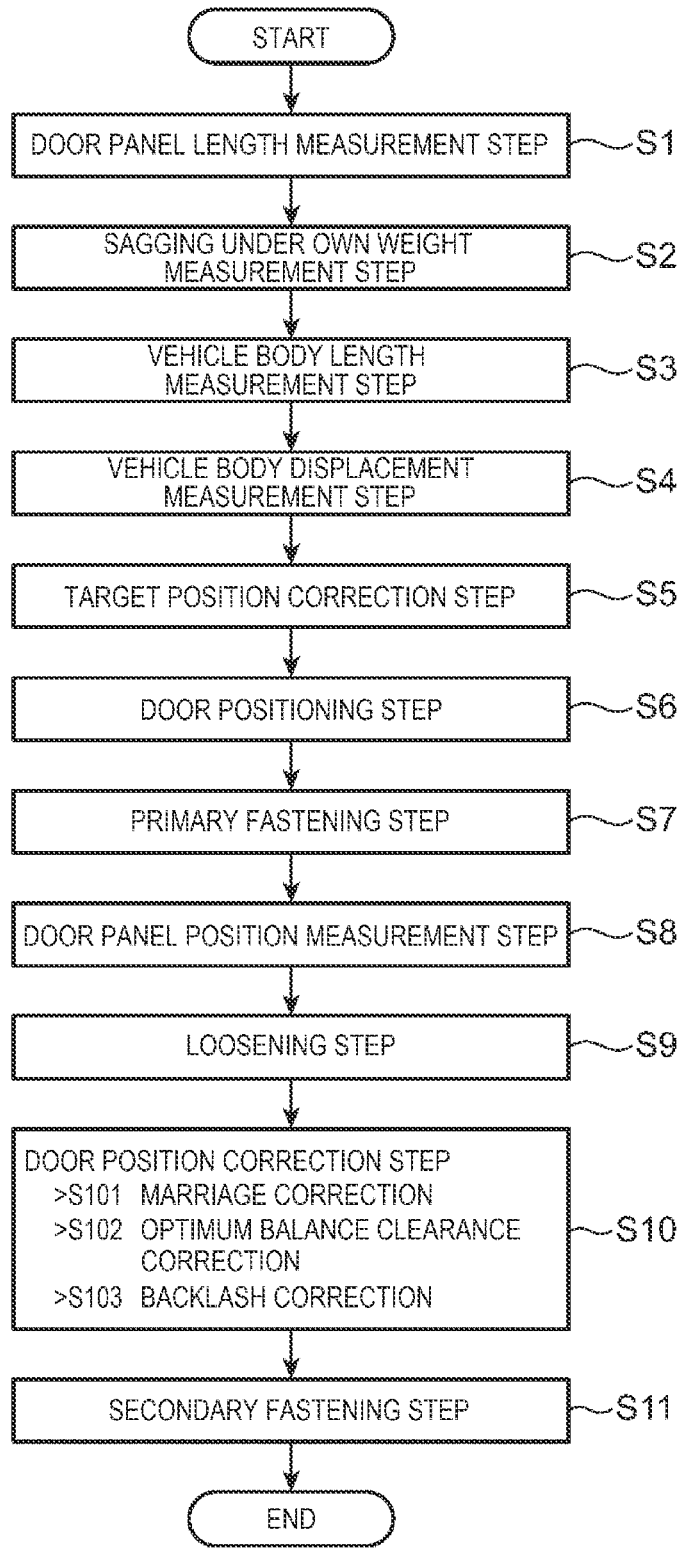
FIG. 8 is flowchart illustrating the embodiment of the door attachment method of the present disclosure.

Next, a further specific description will be made on the door attachment method in this embodiment with reference to a flowchart illustrated in FIG. 8. In the following door attachment method in this embodiment, a description will be made of, as an example, a case where the front door 2 and the rear door 3 are respectively attached to the plural openings 7, 8 that are adjacent to each other and aligned in the longitudinal direction X in the vehicle body 1.

First, a door panel length measurement step (S1) and a sagging under own weight measurement step (S2) are performed by using a sagging under own weight measurement device 33 (see FIG. 6) that is installed near the transportation conveyor 20 for transporting the vehicle body 1.

Figure 9:
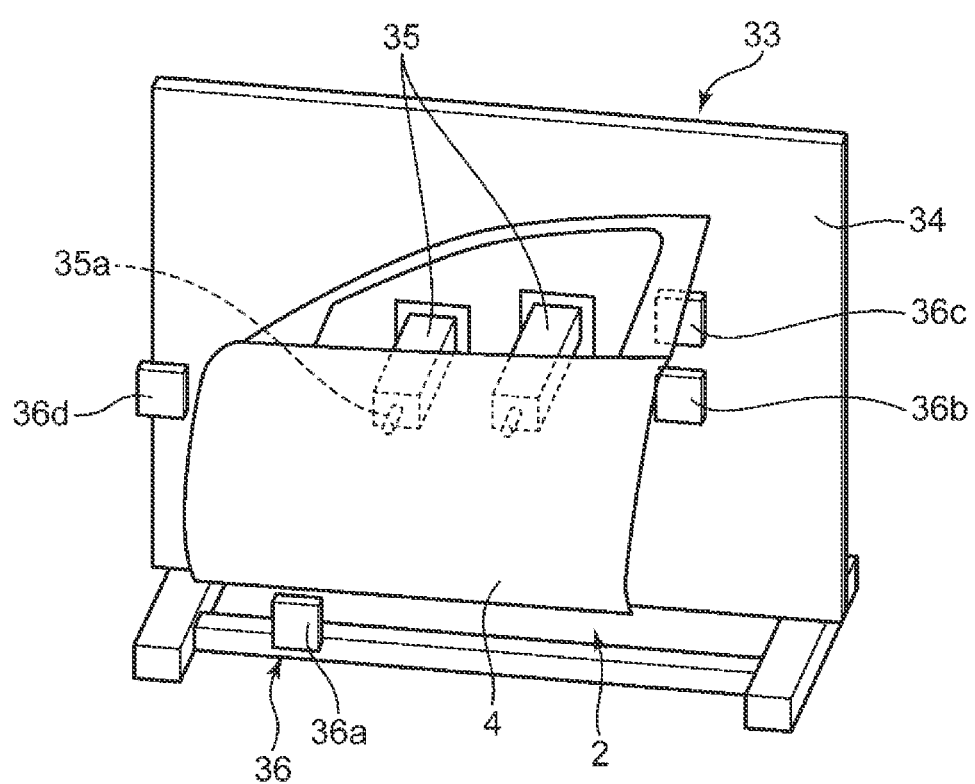
FIG. 9 is a view illustrating an embodiment of a sagging under own weight measurement device used for the door attachment method of the present disclosure, and is a view illustrating a state where the front door is set in the sagging under own weight measurement device.

More specifically, as illustrated in FIG. 9, the door panel length measurement step (S1) and the sagging under own weight measurement step (S2) are performed by attaching one of the door 2 or 3 in a standing state to the sagging under own weight measurement device 33.

Here, "sagging under own weight" means displacement that occurs when the door panel 4 sags under its own weight in the cantilevered state where the door panel 4 is supported only by the hinges 5, 6, and means shifting of the position of the door panel 4 in the cantilevered state from the position of the door panel 4 before the door panel 4 is brought into the cantilevered state.

The sagging under own weight measurement device 33 illustrated in FIG. 9 has a body board 34 that is held in a standing state; plural door panel holding sections 35 that are attached to a front surface of the body board 34; and plural door panel position measurement sections 36 (36a to 36d) that are provided at positions around the door panel holding sections 35 on the front surface of the body board 34. An angle defined by the body board 34 with respect to a horizontal surface can appropriately be set to such an angle that the body board 34 can hold the door panel 4 in the standing state (that is, within a range from an angle that is larger than 0 degree to an angle that is equal to or smaller than 90 degrees). However, in the case where such an angle is approximately 80 degrees (that is, an angle at which the body board 34 is slightly laid from a perpendicular state) or smaller, it is possible to avoid the possibility that the door panel could be dropped from the sagging under own weight measurement device 33.

The door panel holding section 35 is configured to include a reference pin 35a with such a dimension that can be engaged with an opening (not illustrated) formed on a surface facing the inside of the vehicle body 1 in the door panel 4; and a reference pin drive mechanism that inserts/removes the reference pin 35a in/from the opening of the door panel 4.

Each of the door panel position measurement sections 36a to 36d includes means for position measurement such as a two-dimensional laser sensor, and thus can measure positions in the longitudinal direction X and the vertical direction Z of the door panel 4 with respect to a specified position thereof.

Operation of the door panel holding sections 35 is controlled by the control unit 37 (see FIG. 6). Information on the door panel position that is measured by the door panel position measurement sections 36a to 36d is sent to the control unit 37.

The door 2 or 3 is transported into the sagging under own weight measurement device 33 by a different transport device from the door moving device 21, for example. The door 2 or 3 may be transported into the sagging under own weight measurement device 33 by using the door moving device 21. That is, application of the door moving device 21 may be used not only for the application of transporting the doors 2, 3 to the vehicle body 1 but also for application of transporting the doors 2, 3 to the sagging under own weight measurement device 33.

In the door panel length measurement step (S1), in the sagging under own weight measurement device 33, the reference pins 35a of the door panel holding sections 35 are inserted in the openings of the door panel 4 of each of the doors 2, 3, and the door panel 4 is held in the standing state. In this state, door panel lengths L2, L3 (see FIG. 1) in the longitudinal direction X of the door panels 4 of the doors 2, 3, which are respectively attached to the plural openings 7, 8 of the vehicle body 1, are measured.

Figure 3:
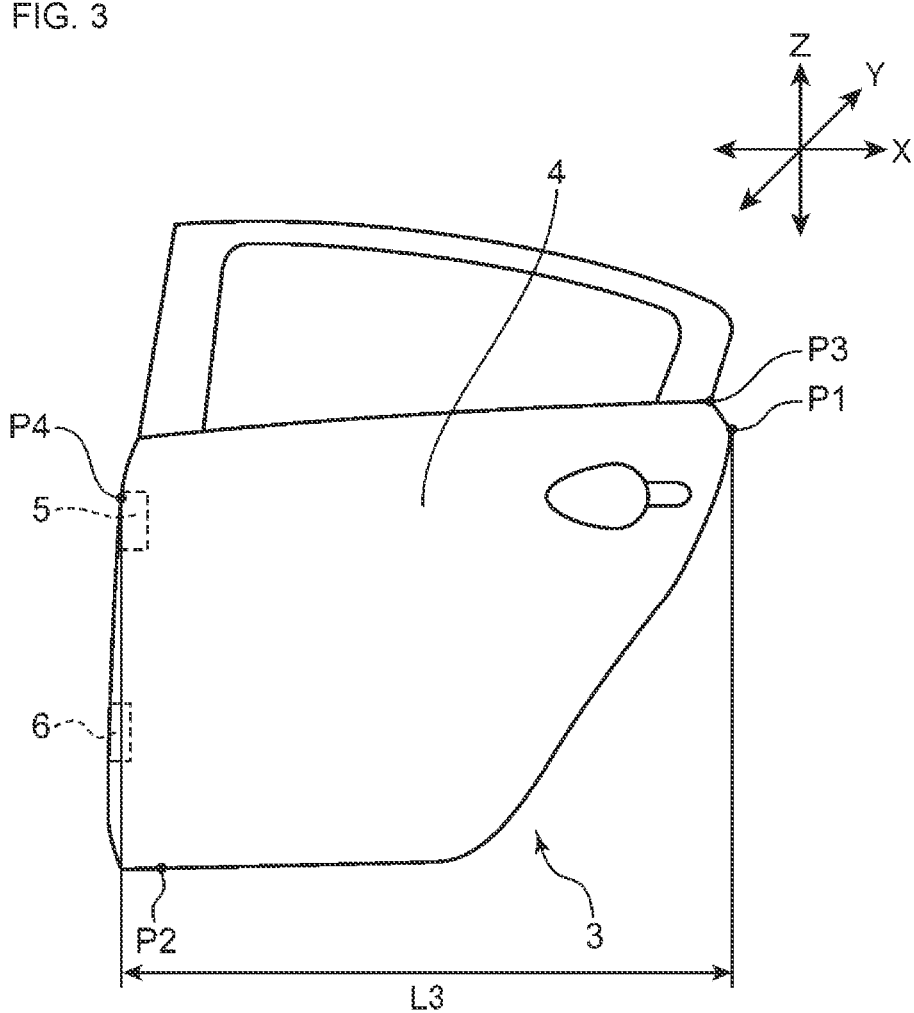
FIG. 3 is a front view of the rear door illustrated in FIG. 1.

More specifically, as the specified position of the door panel 4, for example, as positions of four points, a rear end position P1 in the longitudinal direction X of the door panel 4, a side sill-side lower end position P2, a shoulder upper end position P3, and a front end position P4 in the longitudinal direction X, each of which is illustrated in FIG. 3, are measured by the door panel position measurement sections 36a to 36d. In this way, it is possible to measure the position of the door panel 4 prior to the cantilevered state in the sagging under own weight measurement step (S2).

Figure 10:
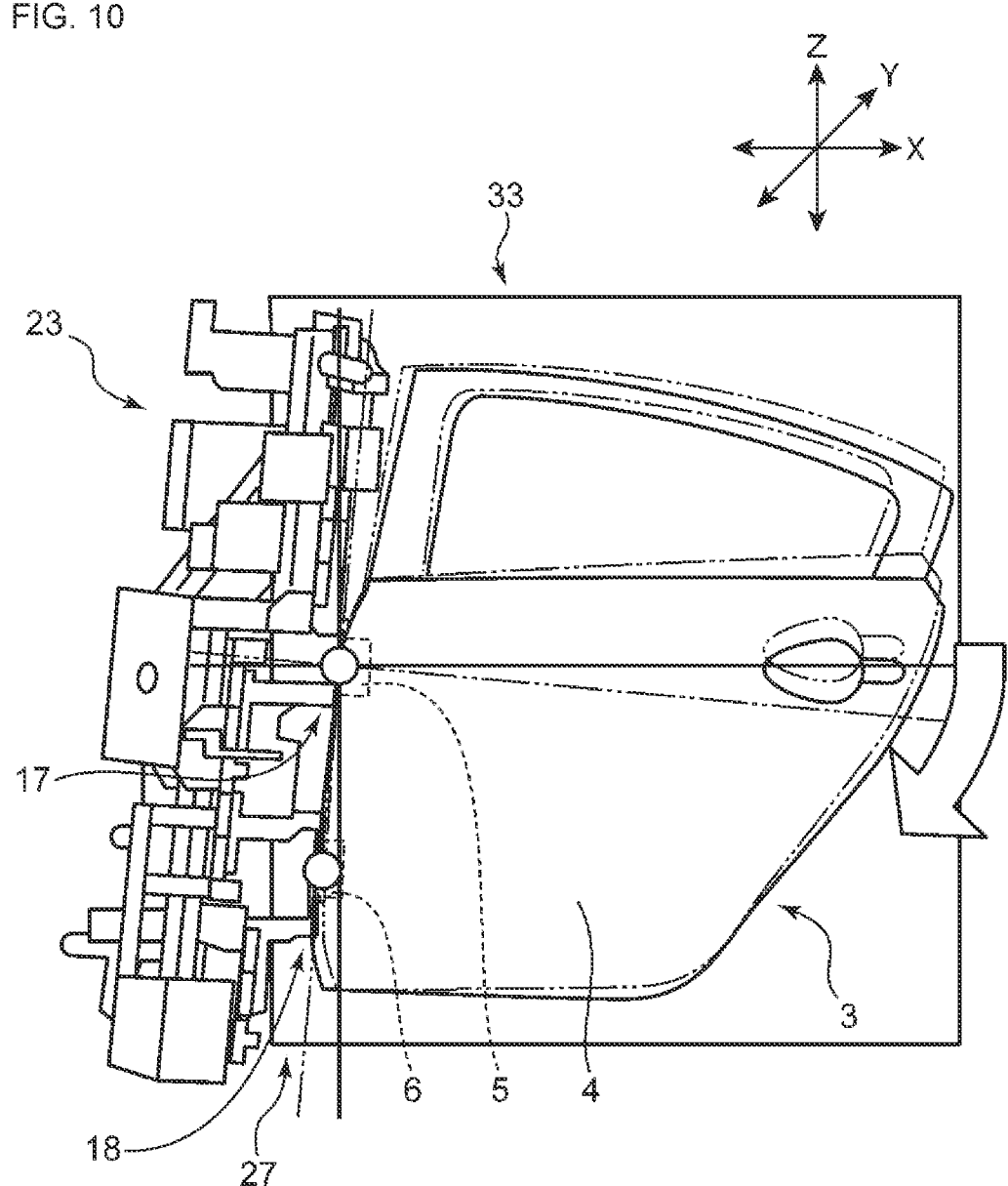
FIG. 10 is an explanatory view illustrating a specific example in which a door panel length measurement step (S1) and a sagging under own weight measurement step (S2) representing the embodiment of the door attachment method of the present disclosure are performed in the sagging under own weight measurement device.

Following the above door panel length measurement step (S1), in the sagging under own weight measurement step (S2), the position of the door panel 4 in the cantilevered state is measured in the sagging under own weight measurement device 33 as illustrated in FIG. 10.

First, the control unit 37 controls the door moving device 21 so as to move the door transportation attachment 23 to a position opposing the outer surface of the door panel 4 of the rear door 3.

Next, the control unit 37 controls the grip mechanism 27 and the door panel holding sections 35 to perform such operation that the clamps 17, 18 of the grip mechanism 27 in the door transportation attachment 23 respectively grip the hinges 5, 6 and the reference pins 35a of the door panel holding sections 35 are removed from the openings of the door panel 4. In this way, holding of the door 3 by the reference pins 35a is discontinued, and the door 3 is brought into the cantilevered state where only the hinges 5, 6 are respectively gripped by the clamps 17, 18. The position of the door panel 4 at the time when this door 3 is in the cantilevered state is measured. More specifically, for example, as the position of the three points that are far from the hinges 5, 6, the rear end position P1, the side sill-side lower end position P2, and the shoulder upper end position P3 in the longitudinal direction X of the door panel 4 illustrated in FIG. 3 are measured by the door panel position measurement sections 36a to 36c.

As data on the positions P1 to P3 of the door panel 4 prior to the cantilevered state, data that is obtained in the above door panel length measurement step (S1) is used. Here, the reference pins 35a may be inserted in the openings of the door panel 4 again to bring the door panel 4 into a state prior to the cantilevered state, and the positions P1 to P3 of the door panel 4 prior to the cantilevered state may be measured again.

Based on the data on the positions of the door panel 4 before and after the cantilevered state, the control unit 37 measures the sagging under own weight that is the displacement of the door panel 4 before and after the cantilevered state.

More specifically, based on the positions P1 to P3 of the door panel 4 before and after the cantilevered state, the sagging under own weight is measured as three change amounts, that is, a "Y-axis sagging angle" around a Y-axis in the width direction Y, an "X-axis change amount" in the longitudinal direction X of the rear end position P1, and a "Z-axis change amount" in the vertical direction Z of the shoulder upper end position P3.

As a correction amount for correcting each change amount of the "Y-axis sagging angle", the "X-axis change amount", and the "Z-axis change amount" that constitute the sagging under own weight, the control unit 37 calculates a "Y-axis correction angle", an "X-axis correction amount", and a "Z-axis correction amount".

In addition, in the vehicle body length measurement step (S3), a distance between two points in the longitudinal direction X of the vehicle body 1 is measured. More specifically, a position measurement device 26, which is illustrated in FIG. 6 and is installed near the transportation conveyor 20, measures an actual length L1 (see FIG. 2) of the vehicle body 1, which will be described below, and a position of each component of the vehicle body 1.

The position measurement device 26 only needs to be configured to be able to measure positions in the longitudinal direction X, the width direction Y, and the vertical direction Z of a specified portion of the vehicle body 1 and, for example, may be configured to include a two-dimensional sensor, a television camera, or the like, may be configured to combine a one-dimensional sensor and one of the two-dimensional sensor and the television camera, or the like.

Figure 2:
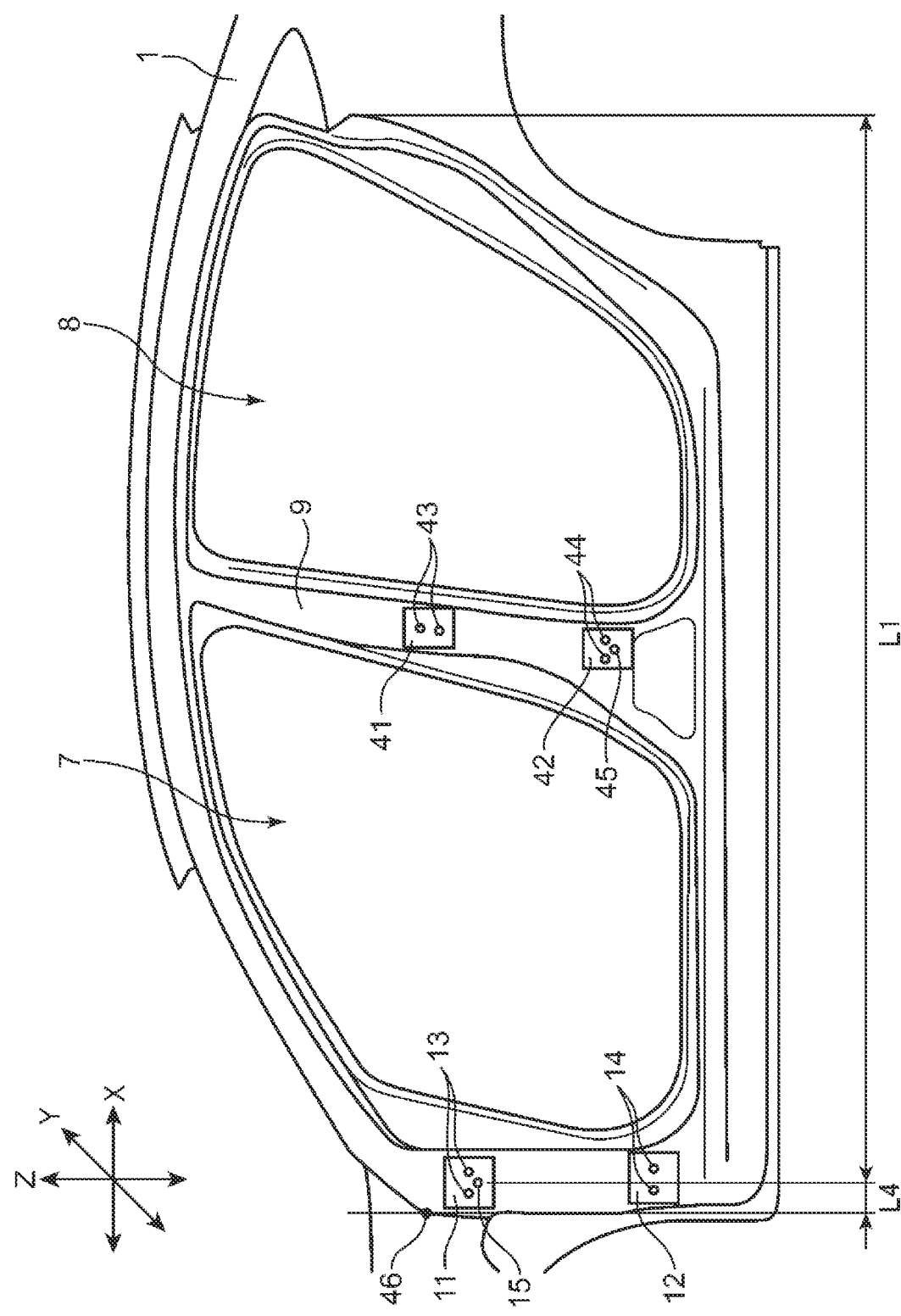
FIG. 2 is an enlarged view of a portion around two openings in the vehicle body illustrated in FIG. 1.

In the vehicle body length measurement step (S3), first, the position measurement device 26 measures, as a position of a specified place used to establish a product coordinate system of the vehicle body 1, a position in the longitudinal direction X and a position in the vertical direction Z of each of the attachment surfaces 11, 12 and the machining reference hole 15 on the front side as well as the attachment surfaces 41, 42 and the machining reference hole 45 on the rear side, which are illustrated in FIG. 2. Furthermore, the position measurement device 26 measures positions in the width direction Y of the attachment surfaces 11, 12, 41, 42.

In this vehicle body length measurement step (S3), the position measurement device 26 measures, as the actual length L1 of the vehicle body 1 in FIG. 2, a distance in the longitudinal direction X from a specified place at a front end of the front-side opening 7 (more specifically, the machining reference hole 15) to a specified place at a rear end of the rear-side opening 8 (more specifically, a boundary portion between the rear end of the opening 8 and a rear fender). Then, as a cowl length L4, a distance in the longitudinal direction X from the front-side machining reference hole 15 to a front fender attachment hole 46.

In the vehicle body displacement measurement step (S4), positions of the attachment surfaces 11, 12 or 41, 42 in the vehicle body 1 are measured, and vehicle body displacement that is displacement between the positions of the attachment surfaces 11, 12 or 41, 42 and reference positions (nominal values) for the attachment surfaces 41, 42, which are set in advance. Here, as data on the positions of the attachment surfaces 11, 12 or 41, 42 in the vehicle body 1, data that is measured in the above vehicle body length measurement step (S3) may be used.

Furthermore, in the vehicle body displacement measurement step of this embodiment, the position of the machining reference hole 15 or 45 in the vehicle body 1 is measured, and displacement between the position of the machining reference hole 15 or 45 and a reference position (a nominal value) for the machining reference hole, which is set in advance, is measured as the vehicle body displacement. Here, as data on the position of the machining reference hole 15 or 45 in the vehicle body 1, data that is measured in the above vehicle body length measurement step (S3) may be used.

More specifically, based on four positions, that is, an "X-direction position" in the longitudinal direction X and a "Z-direction position" in the vertical direction Z of the rear-side machining reference hole 45 in the vehicle body 1, an "upper attachment surface Y-direction position" as the position in the width direction Y of the attachment surface 41 on an upper rear side, and a "lower attachment surface Y-direction position" as the position in the width direction Y of the attachment surface 42 on a lower rear side, the vehicle body displacement is measured as four change amounts, that is, an "X-axis displacement angle" that is a displacement angle from a reference position around an X-axis in the longitudinal direction X, the "X-axis change amount" that is a reference position in the longitudinal direction X of the machining reference hole 45, the "Z-axis change amount" that is displacement from a reference position in the vertical direction Z of the machining reference hole 45, and a "Y-axis change amount" that is displacement from a reference position in the width direction Y of the upper attachment surface 41.

As a correction amount for correcting each change amount of the "X-axis displacement angle", the "X-axis change amount", the "Z-axis change amount", and the "Y-axis change amount" that constitute the vehicle body displacement, an "X-axis correction angle", the "X-axis correction amount", the "Z-axis correction amount", and a "Y-axis correction amount" are calculated.

Next, in a target position correction step (S5), the control unit 37 corrects the target position at which the door panels 4 close the openings 7, 8 of the vehicle body 1, so as to eliminate the displacement of the positions of the door panels 4 caused by the sagging under own weight and the vehicle body displacement.

Next, in a door positioning step (S6), the control unit 37 controls the door moving device 21 to position the doors 2, 3 such that the doors 2, 3 are arranged at the target positions that are corrected as a result of the sagging under own weight and the vehicle body displacement.

Figure 11:
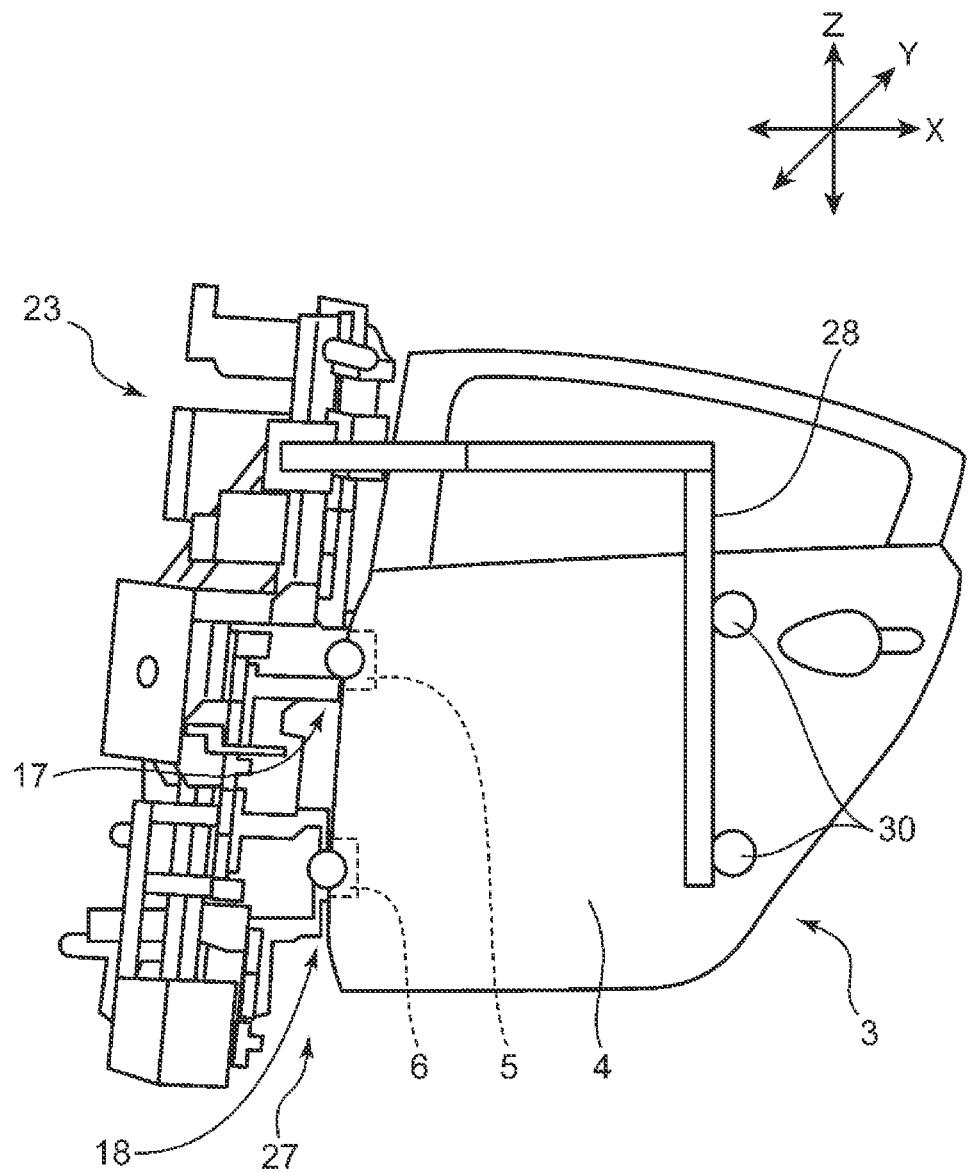
FIG. 11 is an explanatory view illustrating a specific example in which a primary fastening step (S7) representing the embodiment of the door attachment method of the present disclosure is performed.

More specifically, as illustrated in FIG. 11, in the state where the clamps 17, 18 respectively grip the hinges 5, 6 of the door 3 in the vertical direction Z and the sticking units 30 of the door panel holding mechanism 28 stick to the door panel 4, the grip mechanism 27 in the door transportation attachment 23 takes out the door 3 from the inside of the sagging under own weight measurement device 33, moves the door 3 into the opening 8 of the vehicle body 1, and positions the door 3 to be arranged at the corrected target position.

In a state where positioning of the door 3 is completed, just as described, such a state occurs where the clamps 17, 18 of the grip mechanism 27 respectively grip the hinges 5, 6 to cause the hinges 5, 6 to respectively abut the attachment surfaces 41, 42 (see FIG. 5). In a series of the primary fastening step (S7), the door panel position measurement step (S8), the loosening step (S9), the door position correction step (S10), and the secondary fastening step (S11), which will be described below, the control unit 37 controls the door moving device 21 so as to maintain the state where the clamps 17, 18 of the grip mechanism 27 respectively grip the hinges 5, 6 to cause the hinges 5, 6 to respectively abut the attachment surfaces 41, 42.

The rear door 3 and the front door 2 are attached to the vehicle body 1 in this order. However, since the rear door 3 and the front door 2 are attached in the same step, a description will hereinafter be made on the attachment of the rear door 3 as an example.

Next, in the primary fastening step (S7), as illustrated in FIG. 11, while maintaining the state where the clamps 17, 18 respectively grip the hinges 5, 6 in the vertical direction Z and the sticking units 30 stick to the door panel 4, the control unit 37 controls the fastening robot 24 to perform first fastening (the primary fastening) of the hinges 5, 6 to the attachment surfaces 41, 42 of the vehicle body 1 (see FIG. 2 and FIG. 5B) by the bolts 25.

Figure 12:
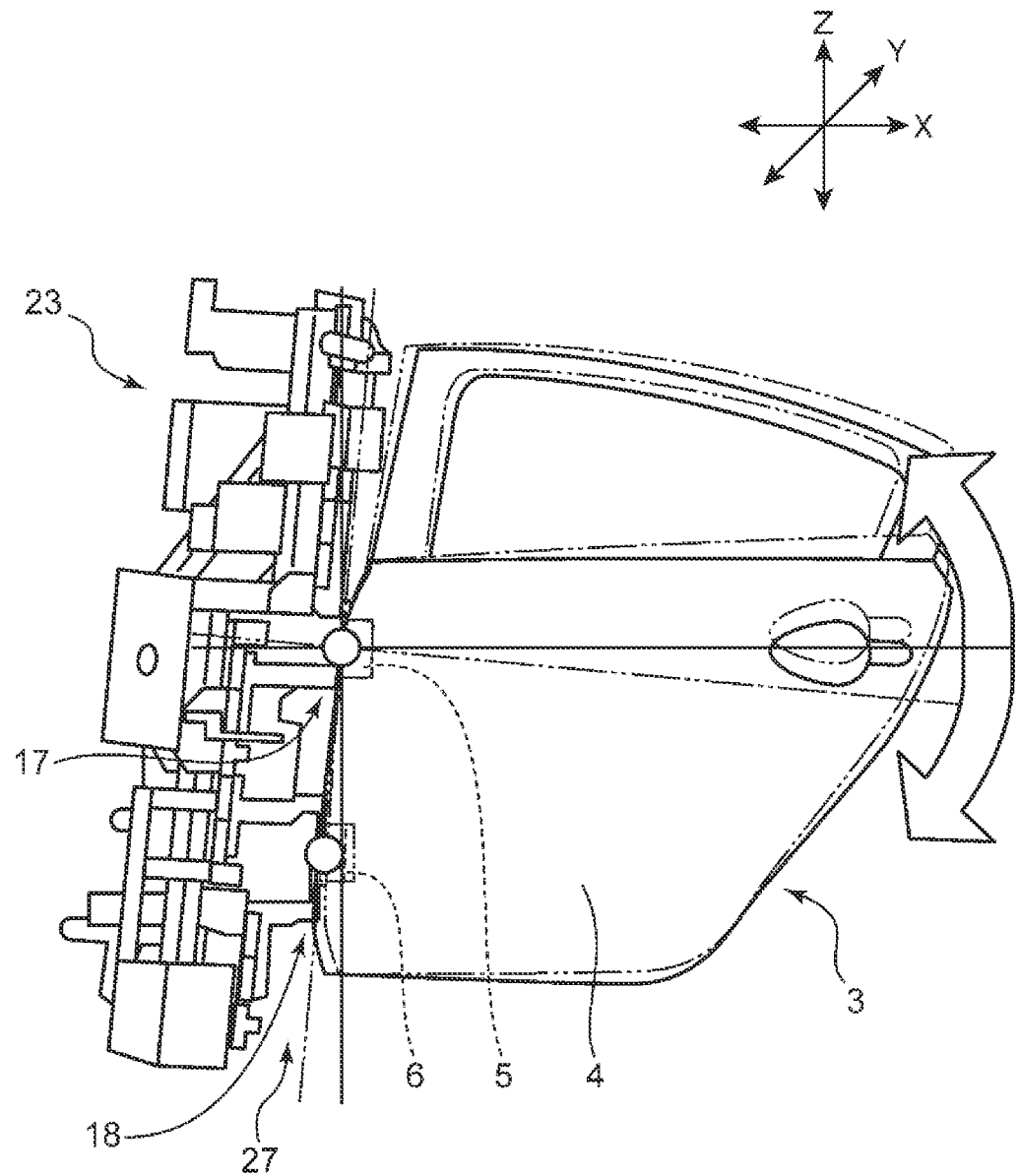
FIG. 12 is an explanatory view illustrating a specific example in which a door panel position measurement step (S8) representing the embodiment of the door attachment method of the present disclosure is performed.

Next, in the door panel position measurement step (S8), as illustrated in FIG. 12, holding of the door panel 4 by the sticking units 30 is discontinued while the clamps 17, 18 of the grip mechanism 27 keep gripping the hinges 5, 6, respectively, so as to bring the door 3 into the cantilevered state. Then, the relative position of the door panel 4 in the opening 8 is measured in the state where the hinges 5, 6 are primarily fastened. In this way, it is possible to accurately measure an actual degree of matching or actual reconciliation (that is, continuity or smoothness) between outer surfaces of the door panel 4 and the vehicle body 1 at the time when the hinges 5, 6 are actually fastened to bring the door 3 into the cantilevered state.

In this embodiment, in the door panel position measurement step (S8), by measuring clearances between the door panel 4 and a circumferential edge of each of the openings 7, 8 at plural positions, the relative position of the door panel 4 in each of the openings 7, 8 is measured. More specifically, the position measurement device 26 measures a "side sill-side vertical clearance t1", a "rear-side longitudinal clearance t2", and a "shoulder vertical level difference t3" illustrated in FIG. 1.

Here, the "side sill-side vertical clearance t1" means a clearance in the vertical direction Z between the rear door 3 and the edge of the opening 8 on the side-sill side (the lower end side) of the rear door 3. The "rear-side longitudinal clearance t2" means a clearance in the longitudinal direction X between a rear end of the rear door 3 and the edge of the opening 8. The "shoulder vertical level difference t3" means a level difference between a shoulder portion at an upper rear end of the rear door 3 and an upper end of the rear fender.

Figure 13:
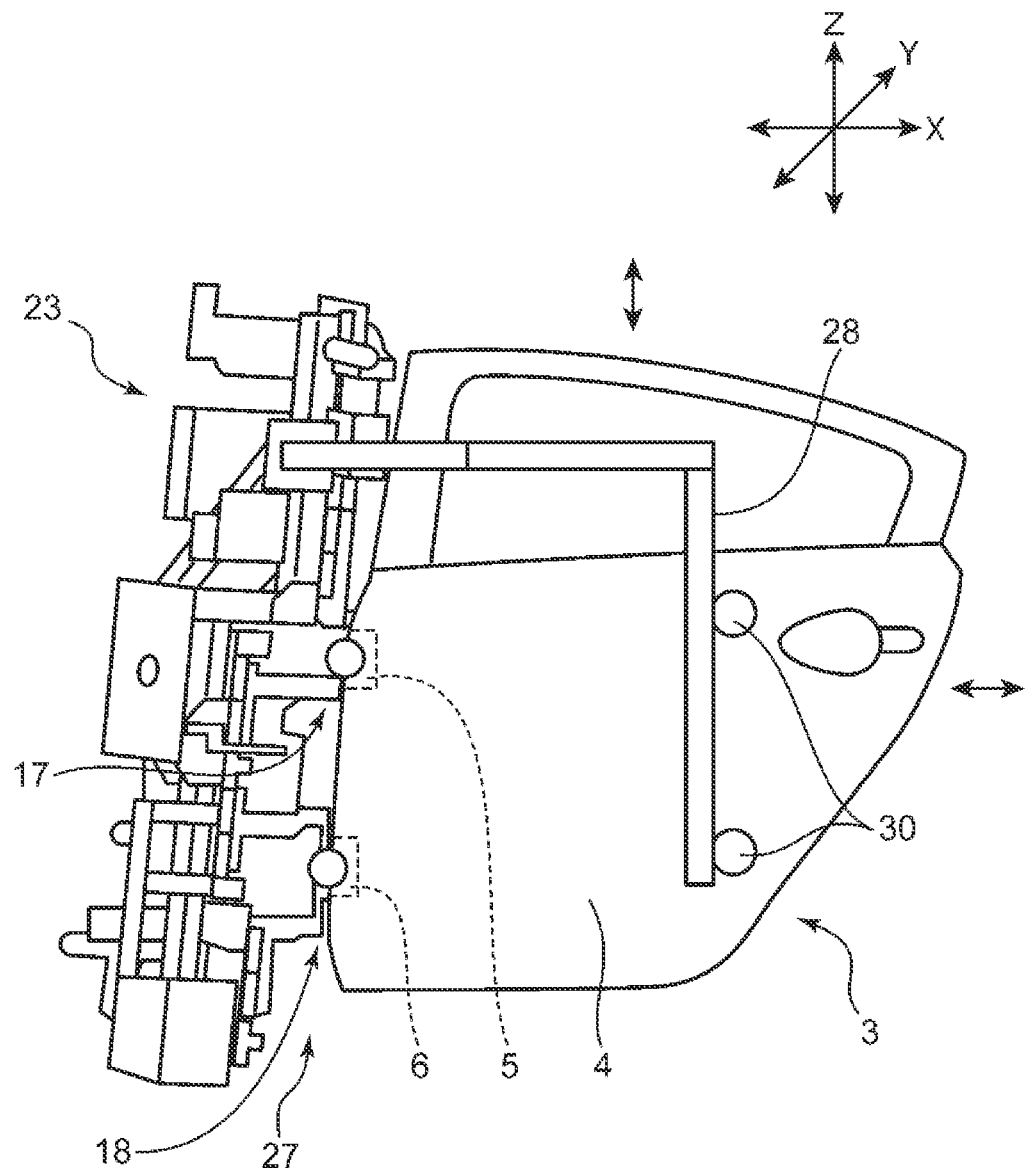
FIG. 13 is an explanatory view illustrating a specific example in which a loosening step (S9), a door position correction step (S10), and a secondary fastening step (S11) representing the embodiment of the door attachment method of the present disclosure are performed.

Next, in the loosening step (S9), as illustrated in FIG. 13, the sticking units 30 stick to the door panel 4 again. Then, while the state where the clamps 17, 18 respectively grip the hinges 5, 6 in the vertical direction Z and the sticking units 30 stick to the door panel 4 is maintained, the fastening robot 24 loosens the bolts 25 that have been fastened in the primary fastening step. In the loosening step, the sticking units 30 stick to the door panel 4. Thus, it is possible to prevent movement of the door panel 4 and the hinges 5, 6 in the width direction Y when the bolts 25 are loosened.

Next, in the door position correction step (S10), the door moving device 21 moves the door within the attachment surfaces 41, 42 on the basis of the measurement result in the door panel position measurement step, so as to correct the position of the door. More specifically, the control unit 37 controls the door moving device 21 so as to move the door 3 in the state illustrated in FIG. 13, that is, the state where, by the door moving device 21 including the clamps 17, 18 of the grip mechanism 27 and the door panel holding mechanism 28, the clamps 17, 18 of the grip mechanism 27 respectively grip the hinges 5, 6 and the door panel holding mechanism 28 holds the door panel 4.

More specifically, in this door position correction step (S10), in order to correct a change amount during the primary fastening of the door 3 (that is, marriage correction S101), the door 3 is moved in the longitudinal direction X and the vertical direction Z and rotated about the Y-axis in the width direction Y, that is, subjected to linear movement and rotational movement within an X-Z plane. In this marriage correction, the door 3 is not moved in the width direction Y. Thus, the abutting positional relationship between the hinges 5, 6 and the attachment surfaces 41, 42 is secured (see FIG. 5C). In this way, it is possible to accurately correct the actual degree of matching or the actual reconciliation (that is, the continuity or the smoothness) between the outer surfaces of the door panel 4 and the vehicle body 1.

In this marriage correction (S101), based on the "side sill-side vertical clearance t1", the "rear-side longitudinal clearance t2", and the "shoulder vertical level difference t3", which are measured in the above door panel position measurement step (S8), as well as on displacement amounts from these reference values (nominal values), the control unit 37 calculates, as correction amounts for the door 3, the "Y-axis correction angle", the "X-axis correction amount", and the "Z-axis correction amount". Then, the control unit 37 controls the door moving device 21 to move the door 3 to a position that is corrected by these correction amounts.

In addition to the above, in the door position correction step (S10), as optimum balance clearance correction (S102), the door moving device 21 corrects the relative position of the door to each of the plural openings 7, 8 such that the door 3 is arranged at a position where a variation in the clearance between the door panel 4 in each of the plural openings 7, 8 and the circumferential edge of each of the openings 7, 8 is minimized, and the variation in the clearance is based on the vehicle body length and a door panel length of each of the door panels 4.

More specifically, in this optimum balance clearance correction (S102), based on the door panel lengths L2, L3 in the longitudinal direction X of the door panels 4 for the front door 2 and the rear door 3, which are measured in the door panel length measurement step (S1), the actual length L1 and the cowl length L4 of the vehicle body 1, which are measured in the vehicle body length measurement step (S3), and reference lengths (nominal values NL1 to NL4) of these lengths L1 to L4, an adjustment amount G of the clearance between the door panel 4 of each of the doors 2, 3 and the circumferential edge of each of the openings 7, 8 is calculated.

The adjustment amount G of the clearance is calculated as in following Formula 1 by focusing on a reduction amount in each of the nominal values NL1 to NL4 of the lengths L1 to L4, for example, (L1−NL1) and the like.

$$G = ((L1 - NL1) + (L4 - NL4) - ((L2 - NL2) + (L3 - NL3))) \times 1/3 \quad \text{(Formula 1)}$$

By adding this adjustment amount G of the clearance to the above "X-axis correction amount", it is possible to improve accuracy of homogeneity of a clearance width between the doors 2, 3.

Furthermore, in the door position correction step (S10), as backlash correction (S103), the position of the door 3 is corrected on the basis of the displacement of the door 3 in a non-operating interval, which is caused by a backlash of the door moving device 21. More specifically, the door moving device 21 having the robot hand and the like includes many power transmission components such a gear therein. Accordingly, the door moving device 21 has such a characteristic that the door moving device 21 can be operated continuously in a manner to correspond to an input signal when being operated to move in the same direction but the non-operating interval caused by the backlash is generated when a moving direction thereof is reversed, or the like. For this reason, before the attachment of the door, the displacement amount of the door 3 in the non-operating interval, which is caused by the backlash of the door moving device 21, is measured and obtained in advance. Then, at the time of the attachment of the door, the position of the door 3 is corrected by a correction amount that is corrected by a displacement amount unique to the door moving device 21.

According to the above description, the backlash can be defined as such a characteristic of the door moving device 21 that the non-operating interval is generated when the operation of the door moving device 21 is changed.

Finally, in the secondary fastening step (S11), as illustrated in FIG. 13, while maintaining the state where the clamps 17, 18 respectively grip the hinges 5, 6 in the vertical direction Z and the sticking units 30 stick to the door panel 4, the control unit 37 controls the fastening robot 24 to perform second fastening (the secondary fastening) of the hinges 5, 6 to the attachment surfaces 41, 42 of the vehicle body 1 (see FIG. 2 and FIG. 5D) by the bolts 25.

After the above assembly of the rear door 3, the primary fastening step (S7) to the secondary fastening step (S11) described above are also performed for the front door 2. By fastening twice as described so far, the doors 2, 3 can be assembled with a high degree of the assembly accuracy.

As described above, in the door attachment method of this embodiment, the hinges 5, 6 are primarily fastened to the attachment surfaces 11, 12 or 41, 42 of the vehicle body 1 in the state where the clamps 17, 18 of the grip mechanism 27 respectively grip the hinges 5, 6. Thereafter, while the state where the clamps 17, 18 of the grip mechanism 27 respectively grip the hinges 5, 6 to cause the hinges 5, 6 to abut the attachment surfaces 11, 12 or 41, 42 is maintained, the series of the door panel position measurement step, the loosening step, the door position correction step, and the secondary fastening step is performed.

In this method, even in the case of the variation in component accuracy of each of the portions of the vehicle body 1 and the doors 2, 3 and the assembly error between the hinges 5, 6 and the door panel 4, the actual position of the door panel 4 in the state after the primary fastening is measured in the door panel position measurement step. Then, after the bolts 25 are loosened, in the door position correction step, the position of the door 2 or 3 is corrected on the basis of the actual measurement result. Thereafter, the secondary fastening is performed. Thus, the door can be assembled with the high degree of accuracy in consideration of the actual inclination of the door panel 4 caused by the own weight.

In other words, when the state where the clamps 17, 18 of the grip mechanism 27 respectively grip the hinges 5, 6 to cause the hinges 5, 6 to abut the attachment surfaces 11, 12 or 41, 42 is maintained, such a state is not changed where the hinges 5, 6 abut the attachment surfaces 11, 12 or 41, 42 during the primary fastening and during the secondary fastening (that is, the state where the distance between each of the hinges 5, 6 and respective one of the attachment surfaces 11, 12 or 41, 42 is zero). Accordingly, even in the case where the position of the door is corrected by loosening the bolts 25 after the primary fastening and then the secondary fastening is performed, it is possible to reproduce the same deflection as the deflection of the door 2 or 3 in the primarily fastened state, that is, to secure the twice-fastening reproducibility with the attachment surfaces 11, 12 or 41, 42 being the reference surfaces. As a result, the door can be assembled with the high degree of accuracy.

In this embodiment, the above twice-fastening reproducibility is secured by the arrangement of the sticking units 30 (that is, the arrangement of the plural sticking units 30 near the side edge 4b of the door panel 4 on the opposite side from the hinges and the arrangement of the plural sticking units 30 along the side edge 4b), by increasing grip strength of the clamps 17, 18 of the grip mechanism 27 for the hinges 5, 6, by increasing rigidity of the door transportation attachment 23, and the like.

The door attachment method in this embodiment includes, prior to the primary fastening step: the sagging under own weight measurement step of measuring, at the position on the outside of each of the openings 7, 8, the sagging under own weight, which is the displacement of the door panel 4 before and after the cantilevered state, by measuring the position of the door panel 4 at the time when the clamps 17, 18 of the grip mechanism 27 respectively grip the hinges 5, 6 to bring each of the doors 2, 3 into the cantilevered state and the position of the door panel 4 before the cantilevered state; the target position correction step of correcting the target position so as to eliminate the displacement caused by the sagging under own weight; and the door positioning step of positioning the door by the door moving device 21 so as to arrange the door at the corrected target position.

As described above, the doors 2, 3 are positioned in the manner to be arranged at the corrected target positions, for which the sagging under own weight of the doors 2, 3 is taken into consideration. In this way, it is possible to perform both of the primary fastening and the secondary fastening with the high degree of accuracy, and the assembly accuracy of the doors 2, 3 is further improved.

However, in the door attachment method according to the present disclosure, the sagging under own weight measurement step and the target position correction step described above are not essential steps and thus may be omitted.

The door attachment method in this embodiment further includes, prior to the primary fastening step, the vehicle body displacement measurement step of measuring the positions of the attachment surfaces 11, 12 and/or 41, 42 in the vehicle body 1 and measuring the vehicle body displacement that is the displacement between the positions of the attachment surfaces 11, 12 and/or 41, 42 and the reference positions for the attachment surfaces 11, 12 and/or 41, 42, which are set in advance. In the target position correction step, the target position is corrected so as to eliminate the displacement of the door panel 4 caused by the sagging under own weight and the vehicle body displacement. In the door positioning step, the door moving device 21 positions the door to be arranged at the target position that is corrected as the result of the sagging under own weight and the vehicle body displacement.

As described above, the doors 2, 3 are positioned in the manner to be arranged at the corrected target positions, for which both of the sagging under own weight of the doors 2, 3 and the vehicle body displacement such as the displacement of the attachment surfaces 11, 12 and/or 41, 42 are taken into consideration. In this way, it is possible to perform both of the primary fastening and the secondary fastening with the higher degree of accuracy, and the assembly accuracy of the doors 2, 3 is further improved.

However, in the door attachment method according to the present disclosure, the above vehicle body displacement measurement step is not an essential step and thus may be omitted. In such a case, the door only needs to be positioned in a manner to be arranged at the corrected target position by eliminating only the displacement caused by the sagging under own weight.

In the door attachment method of this embodiment, in the vehicle body displacement measurement step, the position of the machining reference hole 15 and/or 45 in the vehicle body 1 is measured, and the displacement between the position of the machining reference hole 15 and/or 45 and the reference position for the machining reference hole, which is set in advance, is measured as the vehicle body displacement.

As described above, in the vehicle body displacement measurement step, the vehicle body displacement at the plural positions is measured by measuring the position of the machining reference hole 15 and/or 45 in the vehicle body 1 in addition to the positions of the attachment surfaces 11, 12 and/or 41, 42. In this way, the target position can be corrected with the higher degree of accuracy.

In the door attachment method of this embodiment, in the door panel position measurement step, by measuring the clearances between the door panel 4 and the circumferential edge of each of the openings 7, 8 at the plural positions, the relative position of the door panel 4 in each of the openings 7, 8 is measured.

In the above door panel position measurement step, by measuring the clearances between the door panel 4 and the circumferential edge of each of the openings 7, 8 at the plural positions, the relative position of the door panel 4 in each of the openings 7, 8 can be measured accurately.

In the above door panel position measurement step, by measuring the clearances between the door panel 4 and the circumferential edge of each of the openings 7, 8 at the plural positions, the relative position of the door panel 4 in each of the openings 7, 8 is measured. However, the present disclosure is not limited thereto.

As a modified example of the present disclosure, for example, in the door panel position measurement step, by measuring a distance between an end portion of the door panel 4 and a specified position around each of the openings 7, 8 in the vehicle body 1 (for example, hinge hole positions where the hinges 5, 6 are attached, or the like), the relative position of the door panel 4 in each of the openings 7, 8 may be measured. Also, in such a case as well, the relative position of the door panel 4 in each of the openings 7, 8 can be measured accurately. In addition, in this measurement method, even in the case where the door is attached to the vehicle body that does not have the side sill, the relative position of the door panel 4 in each of the openings 7, 8 can be measured. Thus, versatility of this measurement method is high.

Just as described, when the relative position of the door panel 4 in each of the openings 7, 8 is measured, the measurement of the clearances and the level difference may be substituted by measurement of a distance to another characteristic shape portion on the circumferential edge of each of the openings 7, 8 in the vehicle body 1, pitch accuracy of which is reliable.

In the door attachment method of this embodiment, in the door position correction step, the door moving device 21, which includes the clamps 17, 18 of the grip mechanism 27 and the door panel holding mechanism 28, moves the doors 2, 3 in the state where the clamps 17, 18 of the grip mechanism 27 respectively grip the hinges 5, 6 and the door panel holding mechanism 28 holds the door panel 4.

In the above door position correction step, when moving the door to the target position, the door moving device 21 can move each of the doors 2, 3 in the state where the clamps 17, 18 of the grip mechanism 27 respectively grip the hinges 5, 6 and the door panel holding mechanism 28 holds the door panel 4. Thus, during the movement of the door in the door position correction step and each of the steps, the relative position of the door panel 4 to the hinges 5, 6 is less likely to be displaced. As a result, the assembly accuracy of the doors 2, 3 is further improved.

In the door attachment method of this embodiment, the vehicle body 1 has the plural openings 7, 8 that are adjacent to each other and aligned in the specified direction (the longitudinal direction X in the above embodiment), where a door is attached to each of plural openings 7, 8. The door attachment method further includes, prior to the primary fastening step: the vehicle body length measurement step of measuring the distance (for example, the actual length L1 of the vehicle body 1 and the cowl length L4) between two points in the specified direction (the longitudinal direction X) in the vehicle body 1; and the door panel length measurement step of measuring the door panel lengths L2, L3 in the specified direction (the longitudinal direction X) of the door panels 4 for the doors 2, 3, which are respectively attached to the plural openings 7, 8. In the door position correction step, the door moving device 21 corrects the relative position of the door to each of the plural openings 7, 8 such that the door is arranged at such a position to minimize the variation in the clearance between the door panel 4 in each of the plural openings 7, 8 and the circumferential edge of each of the openings 7, 8, which is based on the actual length L1 of the vehicle body 1, the cowl length L4, and respective one of the door panel lengths L2, L3 of the door panels 4.

As described above, in the case where the vehicle body 1 has the plural openings 7, 8 and the doors 2, 3 are respectively attached to the plural openings 7, 8, the door moving device 21 corrects the relative position of the door in each of the plural openings 7, 8 on the basis of the actual length L1 of the vehicle body 1, the cowl length L4, and each of the lengths L2, L3 of the door panels 4 such that the door is arranged at the position to minimize the variation in the clearance between the door 4 in each of the plural openings 7, 8 and the circumferential edge of respective one of the openings 7, 8. Thus, even in the case where the plural doors 2, 3 are provided, the assembly accuracy of each of the doors 2, 3 can be improved.

In the door attachment method of this embodiment, in the door position correction step, the position of the door is corrected on the basis of the displacement of the door in the non-operating interval, which is caused by the backlash of the door moving device 21.

As described above, the position of each of the doors 2, 3 is corrected on the basis of the displacement of respective one of the doors 2, 3 in the non-operating interval, which is caused by the backlash of the door moving device 21. Thus, the assembly accuracy of the doors 2, 3 is further improved.

Since the door attachment method in this embodiment is applied to the attachment of the door to the vehicle body 1, the assembly accuracy of the doors 2, 3 to the vehicle body 1 can be improved.

The door moving device 21 in this embodiment includes the grip mechanism 27 having the clamps 17, 18 that respectively grip the hinges 5, 6; the door panel holding mechanism 28 that holds the door panel 4; and the robot hand 22 as the moving mechanism that moves the grip mechanism 27 and the door panel holding mechanism 28.

When moving each of the doors 2, 3 to the attachment position, the door moving device 21, which is configured as described above, can move respective one of the doors 2, 3 in the state where the clamps 17, 18 of the grip mechanism 27 respectively grip the hinges 5, 6 and the door panel holding mechanism 28 holds the door panel 4. Thus, during the movement of each of the doors 2, 3, the relative position of the door panel 4 to the hinges 5, 6 is less likely to be displaced. As a result, the assembly accuracy of the doors 2, 3 is further improved.

Here, the moving mechanism of the present disclosure only needs to have a configuration capable of moving the grip mechanism 27 and the door panel holding mechanism 28, and may have a configuration other than the above robot hand 22 such as an automated travel vehicle or an unattended carrier.

In the door moving device 21 of this embodiment, the door panel holding mechanism 28 has the sticking units 30, each of which sticks to the outer surface of the door panel 4. Thus, when the sticking units 30 stick to the outer surface of the door panel 4, it is possible to stably hold the door panel 4.

In the door moving device 21 of this embodiment, the sticking units 30 are arranged to stick to the portion near the side edge 4b on the opposite side from the side edge 4a, to which the hinges 5, 6 are attached, in the door panel 4.

In the portion near the side edge 4b on the opposite side from the side edge 4a, to which the hinges 5, 6 are attached, in the door panel 4, the displacement of the door panel 4, which caused by the sagging under own weight, is increased in the cantilevered state of each of the doors 2, 3 where the clamps 17, 18 of the grip mechanism 27 respectively grip the hinges 5, 6. Accordingly, the sticking units 30 stick to such a portion. As a result, the door panel 4 can further stably be held.

In the door moving device 21 of this embodiment, the plural sticking units 30 are aligned along the side edge 4b on the opposite side. Thus, it is possible to further stably hold the door panel 4 by the plural sticking units 30. In addition, since the weight of the door panel 4 is dispersed and received by the plural sticking units 30, it is possible to reduce the distortion of the door panel 4 at the time when the plural sticking units 30 stick to the door panel 4.

In the door moving device 21 of this embodiment, the grip mechanism 27 is configured to be able to change the positions of gripping the hinges 5, 6 so as to correspond to the plural types of the doors with the different attachment positions of the hinges 5, 6 to the door panel 4.

Accordingly, it is possible to grip the hinges 5, 6 in a manner to correspond to the plural types of the doors with the different attachment positions of the hinges 5, 6 to the door panel 4. As a result, versatility of the door moving device 21 is improved.

The sagging under own weight measurement device 33, which is used for the door attachment method in this embodiment, includes the door panel holding sections 35, each of which has the reference pin 35a configured to be able to discontinue holding of the door panel 4 in the state where the door panel 4 is held in the standing state and the holding mechanism 27 holds the hinges 5, 6; and the door panel position measurement sections 36a to 36d that measure the positions of the plural portions of the door panel 4 in each of the state where the door panel holding sections 35 hold the door panel 4 and the state where holding of the door panel 4 is discontinued and the grip mechanism 27 grips the hinges 5, 6 to bring each of the doors 2, 3 into the cantilevered state.

As described above, when the above sagging under own weight measurement device 33 is arranged at the position on the outside of the openings 7, 8 of the vehicle body 1, the sagging under own weight measurement step can be performed in the sagging under own weight measurement device 33 with the high degree of accuracy. That is, in the sagging under own weight measurement step using the sagging under own weight measurement device 33, before the clamps 17, 18 of the grip mechanism 27 respectively grip the hinges 5, 6 to bring the door into the cantilevered state, the door panel holding sections 35 hold the door panel 4, and the door panel position measurement sections 36a to 36c measure the positions of the plural portions of the door panel 4 before the cantilevered state. Then, the door panel position measurement sections 36a to 36c measure the positions of the plural portions of the door panel 4 at the time when the holding state of the door panel 4 by the door panel holding sections 35 is discontinued and the clamps 17, 18 of the grip mechanism 27 respectively grip the hinges 5, 6 to bring the door into the cantilevered state. In this way, it is possible to accurately measure the sagging under own weight that is the displacement of the door panel 4 before and after the cantilevered state in the sagging under own weight measurement device 33.

The door panel holding sections 35 of the sagging under own weight measurement device 33 only needs to be configured to be able to hold and discontinue holding the door panel 4 of the present disclosure, and is not limited to the configuration to include the reference pins 35a that can be inserted in the openings of the door panel 4 as in the above embodiment. Thus, a door panel holding section may include an electromagnet, a vacuum sticking mechanism, and the like instead of the reference pins 35a.

In the above embodiment, a description has been made of the vehicle body 1, which serves as the attachment target of the hinged door, as an example. However, the present disclosure is not limited to the vehicle body 1. The attachment targets in the present disclosure include attachment targets other than the vehicle body 1; for example, fixed facilities such as prefabricated housing in addition to vehicles such as a watercraft and an aircraft. In such a case, the arrangement of the openings, to each of which the hinged door is attached, may be arrangement in which the openings are aligned in the vertical direction instead of the arrangement in which the openings are aligned in the longitudinal direction X of the vehicle body 1 as in the above embodiment.

In the above embodiment, a description has been made of the example in which the door panel holding mechanism 28 has the sticking units 30 that stick to the outer surface of the door panel 4. However, the present disclosure is not limited thereto. Instead of at least one of the sticking units 30 (for example, the sticking unit 30 at the highest position), the door panel holding mechanism 28 may have a sash holding mechanism that holds a sash (a window frame) provided in an upper portion of the door panel 4. Also, in the case where the sash holding mechanism is used in place of the sticking unit 30, just as described, it is possible to stably hold the door panel 4.

In the above embodiment, in order to simplify an overall configuration of an automated door attachment system that implements the present disclosure, FIG. 6 illustrates the example in which the door moving device 21, the fastening robot 24 (fastening mechanism), and the sagging under own weight measurement device 33 are controlled by the single control unit 37 in a concentrative fashion. However, the present disclosure is not limited thereto. As a system that serves as a modified example of the present disclosure and is adopted for an actual automobile assembly line, such a system is adopted that each of the door moving device 21, the fastening robot 24 (the fastening mechanism), and the sagging under own weight measurement device 33 has a respective control panel (control unit) and that a step panel that controls those control panels and each of the control panels communicate with each other to control connection.

The disclosed embodiment is summarized as follows:

The door attachment method according to one embodiment is the door attachment method for attaching the door having the door panel and the hinge to the opening of the attachment target in the freely openable/closable manner, and includes: the primary fastening step of fastening the hinge to the specified attachment surface of the attachment target with the specified magnitude of torque by the fastening mechanism using the fastening member in the state where the door panel holding mechanism holds the door panel to arrange the door at the target position at which the door panel closes the opening, and the grip mechanism grips the hinge; the door panel position measurement step of discontinuing holding of the door panel while the grip mechanism keeps gripping the hinge, so as to bring the door into the cantilevered state and measuring the relative position of the door panel in the opening in the state where the hinge is primarily fastened; the loosening step of loosening fastening of the fastening member by the fastening mechanism; the door position correction step of moving the door within the attachment surface by the door moving device on the basis of the measurement result in the door panel position measurement step, so as to correct the position of the door; and the secondary fastening step of fastening the hinge again to the attachment surface with the specified magnitude of torque by the fastening mechanism using the fastening member. In the series of the primary fastening step, the door panel position measurement step, the loosening step, the door position correction step, and the secondary fastening step, the state where the grip mechanism grips the hinge to cause the hinge to abut the attachment surface is maintained.

As described above, in the door attachment method of this embodiment, the hinge is primarily fastened to the attachment surface of the attachment target in the state where the grip mechanism grips the hinge. Thereafter, while the state where the grip mechanism grips the hinge to cause the hinge to abut the attachment surface is maintained, the series of the door panel position measurement step, the loosening step, the door position correction step, and the secondary fastening step is performed.

In this method, even in the case of the variation in component accuracy of each of the portions of the attachment target and the door and the assembly error between the hinge and the door panel, the actual position of the door panel in the state after the primary fastening is measured in the door panel position measurement step. Then, after the fastening member is loosened, in the door position correction step, the position of the door is corrected on the basis of the actual measurement result. Thereafter, the secondary fastening is performed. Thus, the door can be assembled with a high degree of accuracy in consideration of the actual inclination of the door panel caused by its own weight.

In other words, when the state where the grip mechanism grips the hinge to cause the hinge to abut the attachment surface is maintained, such a state is not changed where the hinge abuts the attachment surface during the primary fastening and during the secondary fastening (that is, the state where the distance between the hinge and the attachment surface is zero). Accordingly, even in the case where the position of the door is corrected by loosening the fastening member after the primary fastening and then the secondary fastening is performed, it is possible to reproduce the same deflection as the deflection of the door in the primarily fastened state, that is, to secure the twice-fastening reproducibility with the attachment surface being the reference surface. As a result, the door can be assembled with a high degree of accuracy.

Preferably, the above door attachment method further includes, prior to the primary fastening step, the sagging under own weight measurement step of measuring, at the position on the outside of the opening, the sagging under own weight, which is the displacement of the door panel before and after the cantilevered state, by measuring the position of the door panel at the time when the grip mechanism grips the hinge to bring the door into the cantilevered state and the position of the door panel before the cantilevered state; the target position correction step of correcting the target position so as to eliminate the displacement caused by the sagging under own weight; and the door positioning step of positioning the door by the door moving device so as to arrange the door at the corrected target position.

In such a door attachment method, the door is positioned in the manner to be arranged at the corrected target position, for which the sagging under own weight of the door is taken into consideration. In this way, it is possible to perform both of the primary fastening and the secondary fastening with a high degree of accuracy, and the assembly accuracy of the door is further improved.

Preferably, the above door attachment method further includes, prior to the primary fastening step, the attachment target displacement measurement step of measuring the position of the attachment surface in the attachment target and measuring the attachment target displacement that is the displacement between the position of the attachment surface and the reference position for the attachment surface, which is set in advance. Preferably, in the target position correction step, the target position is corrected so as to eliminate the displacement of the door panel caused by the sagging under own weight and the attachment target displacement. Preferably, in the door positioning step, the door moving device preferably positions the door to be arranged at the target position that is corrected as the result of the sagging under own weight and the attachment target displacement.

In such a door attachment method, the door is positioned in the manner to be arranged at the corrected target position, for which both of the sagging under own weight of the door and the attachment target displacement such as the displacement of the attachment surface are taken into consideration. In this way, it is possible to perform both of the primary fastening and the secondary fastening with a higher degree of accuracy, and the assembly accuracy of the door is further improved.

Preferably, in the above door attachment method, in the attachment target displacement measurement step, the position of the machining reference hole in the attachment target is measured, and the displacement between the position of the machining reference hole and the reference position for the machining reference hole, which is set in advance, is measured as the attachment target displacement.

In such a door attachment method, in the attachment target displacement measurement step, the attachment target displacement at the plural positions is measured by measuring the position of the machining reference hole in the attachment target in addition to the position of the attachment surface. In this way, the target position can be corrected with a higher degree of accuracy.

Preferably, in the above door attachment method, in the door panel position measurement step, by measuring the clearances between the door panel and the circumferential edge of the opening at the plural positions, the relative position of the door panel in the opening is measured.

In such a door attachment method, in the door panel position measurement step, by measuring the clearances between the door panel and the circumferential edge of the opening at the plural positions, the relative position of the door panel in the opening can be measured accurately.

Preferably, in the above door attachment method, in the door position correction step, the door moving device, which includes the grip mechanism and the door panel holding mechanism, moves the door in the state where the grip mechanism grips the hinge and the door panel holding mechanism holds the door panel.

In such a door attachment method, in the door position correction step, when moving the door to the target position, the door moving device can move the door in the state where the grip mechanism grips the hinges and the door panel holding mechanism holds the door panel. Thus, during the movement of the door, the relative position of the door panel to the hinges is less likely to be displaced. As a result, the assembly accuracy of the door is further improved.

Preferably, in the above door attachment method, the attachment target has the plural openings that are adjacent to each other and aligned in the specified direction, and the door is attached to each of the plural openings. Preferably, the door attachment method further includes, prior to the primary fastening step: the attachment target length measurement step of measuring the distance between the two points in the specified direction in the attachment target; and the door panel length measurement step of measuring the door panel length in the specified direction of each of the door panels for the doors, which are respectively attached to the plural openings. Preferably, in the door position correction step, the door moving device corrects the relative position of the door to each of the plural openings such that the door is arranged at a position to minimize the variation in the clearance between the door panel in each of the plural openings and the circumferential edge of each of the openings, which is based on the length of the attachment target and the door panel length of each of the door panels.

In such a door attachment method, in the case where the attachment target has the plural openings and the door is attached to each of the plural openings, the door moving device corrects the relative position of the door in each of the plural openings on the basis of the actual length of the attachment target and each of the door panel lengths such that the door is arranged at the position to minimize the variation in the clearance between the door in each of the plural openings and the circumferential edge of respective one of the openings. Thus, even in the case where the plural doors are provided, the assembly accuracy of each of the doors can be improved.

Preferably, in the door attachment method, in the door position correction step, the position of the door is corrected on the basis of the displacement of the door in the non-operating interval, which is caused by the backlash of the door moving device.

In such a door attachment method, the position of the door is corrected on the basis of the displacement of the door in the non-operating interval, which is caused by the backlash of the door moving device. Thus, the assembly accuracy of the door is further improved.

Preferably, in the above door attachment method, the attachment target is the vehicle body. Since the door attachment method as described above is applied to the attachment of the door to the vehicle body, the assembly accuracy of the door to the vehicle body can be improved.

The door moving device in the embodiment is the door moving device used for the door attachment method in the embodiment, and includes: the grip mechanism that grips the hinge; the door panel holding mechanism that holds the door panel; and the moving mechanism that moves the grip mechanism and the door panel holding mechanism.

When moving the door to the attachment position, the door moving device having such a configuration can move the door in the state where the grip mechanism holds the hinges and the door panel holding mechanism holds the door panel. Thus, during the movement of the door, the relative position of the door panel to the hinges is less likely to be displaced. As a result, the assembly accuracy of the door is further improved.

Preferably, in the above door moving device, the door panel holding mechanism has the sticking unit that sticks to the outer surface of the door panel.

With such a configuration, the sticking unit sticks to the outer surface of the door panel. Thus, it is possible to stably hold the door panel.

Preferably, in the above door moving device, the sticking unit is arranged to stick to the portion near the side edge on the opposite side from the side edge, to which the hinge is attached, in the door panel.

With such a configuration, in the portion near the side edge on the opposite side from the side edge, to which the hinge is attached, in the door panel, the displacement of the door panel, which is caused by the sagging under own weight, is increased in the cantilevered state of the door where the grip mechanism grips the hinge. Accordingly, the sticking unit sticks to such a portion. As a result, the door panel can further stably be held.

Preferably, in the above door moving device, the plural sticking units are aligned along the side edge on the opposite side.

With such a configuration, it is possible to further stably hold the door panel by the plural sticking units. In addition, since the weight of the door panel is dispersed and received by the plural sticking units, it is possible to reduce the distortion of the door panel at the time when the plural sticking units stick to the door panel.

Preferably, in the above door moving device, the grip mechanism is configured to be able to change the position of gripping the hinge so as to correspond to plural types of doors with a different attachment position of the hinge to the door panel.

With such a configuration, it is possible to grip the hinge in the manner to correspond to plural types of doors with different attachment positions of the hinge to the door panel. As a result, the versatility of the door moving device is improved.

The sagging under own weight measurement device in this embodiment is the sagging under own weight measurement device used for the door attachment method in the embodiment, and includes the door panel holding section that is configured to be able to hold the door panel in the standing state and discontinue holding of the door panel in the state where the holding mechanism holds the hinge; and the door panel position measurement section that measures the positions of the plural portions of the door panel in each of the state where the door panel holding section holds the door panel and the state where holding of the door panel is discontinued and the grip mechanism grips the hinge to bring the door into the cantilevered state.

When the sagging under own weight measurement device is arranged at the position on the outside of the opening of the attachment target, the sagging under own weight measurement step can be performed in the sagging under own weight measurement device with a high degree of accuracy.

That is, in the sagging under own weight measurement step using the sagging under own weight measurement device, before the grip mechanism grips the hinge to bring the door into the cantilevered state, the door panel holding section holds the door panel, and the door panel position measurement section measures the positions of the plural portions of the door panel before the cantilevered state.

Next, the door panel position measurement section measures the positions of the plural portions of the door panel at the time when the holding state of the door panel by the door panel holding section is discontinued and the grip mechanism grips the hinge to bring the door into the cantilevered state.

In this way, it is possible to accurately measure the sagging under own weight that is the displacement of the door panel before and after the cantilevered state in the sagging under own weight measurement device.

As it has been described so far, according to the door attachment method of this embodiment, the door can be assembled with a high degree of accuracy.

In addition, when the above door attachment method is performed by using the door moving device of this embodiment, the assembly accuracy of the door is further improved.

Furthermore, when the above door attachment method is performed by using the sagging under own weight measurement device of the embodiment, in the sagging under own weight measurement step, it is possible to accurately measure the sagging under own weight of the door.

What is claimed is:

1. A door attachment method for attaching a door having a door panel and a hinge to an opening of an attachment target in a freely openable/closable manner, the door attachment method comprising:
   a primary fastening step of fastening the hinge to a specified attachment surface of the attachment target with a specified magnitude of torque by a fastening mechanism using a fastening member in a state where a door panel holding mechanism holds the door panel to arrange the door at a target position, at which said door panel closes the opening, and the holding mechanism holds the hinge;
   a door panel position measurement step of discontinuing holding of the door panel while the grip mechanism keeps gripping the hinge, so as to bring the door into a cantilevered state and measuring a relative position of the door panel in the opening in a state where the hinge is primarily fastened;
   a loosening step of loosening fastening of the fastening member by the fastening mechanism;
   a door position correction step of moving the door by a door moving device on the basis of a measurement result in the door panel position measurement step, so as to correct a position of the door; and
   a secondary fastening step of fastening the hinge again to the attachment surface with the specified magnitude of torque by the fastening mechanism using the fastening member, wherein
   in a series of the primary fastening step, the door panel position measurement step, the loosening step, the door position correction step, and the secondary fastening step, a state where the grip mechanism grips the hinge to cause the hinge to abut the attachment surface is maintained.

2. The door attachment method according to claim 1 further comprising,
   prior to the primary fastening step:
   a sagging under own weight measurement step of measuring, at a position on the outside of the opening, sagging under own weight, which is displacement of the door panel before and after the cantilevered state, by measuring a position of the door panel at the time when the grip mechanism grips the hinge to bring the door into the cantilevered state and a position of the door panel before it is brought into the cantilevered state;
   a target position correction step of correcting the target position so as to eliminate the displacement caused by sagging under own weight; and
   a door positioning step of positioning the door by the door moving device so as to arrange the door at the corrected target position.

3. The door attachment method according to claim 2 further comprising:
   an attachment target displacement measurement step of measuring the position of the attachment surface in the attachment target and measuring attachment target displacement that is displacement between the position of said attachment surface and a reference position for the attachment surface, which is set in advance, wherein
   in the target position correction step, the target position is corrected so as to eliminate the displacement of the door panel caused by the sagging under own weight and the attachment target displacement, and
   in the door positioning step, the door moving device positions the door to be arranged at the target position that is corrected as a result of the sagging under own weight and the attachment target displacement.

4. The door attachment method according to claim 3, wherein
in the attachment target displacement measurement step, a position of a machining reference hole in the attachment target is measured, and displacement between the position of the machining reference hole and a reference position for the machining reference hole, which is set in advance, is measured as the attachment target displacement.

5. The door attachment method according to claim 1, wherein
in the door panel position measurement step, by measuring clearances between the door panel and a circumferential edge of the opening at plural positions, a relative position of the door panel in the opening is measured.

6. The door attachment method according to claim 1, wherein
in the door position correction step, the door moving device, which includes the grip mechanism and the door panel holding mechanism, moves the door in a state where the grip mechanism grips the hinge and the door panel holding mechanism holds the door panel.

7. The door attachment method according to claim 1,
the attachment target having plural openings that are adjacent to each other and aligned in a specified direction, and one of the door being attached to each of the plural openings,
the method further comprising,
prior to the primary fastening step:
an attachment target length measurement step of measuring a distance between two points in the specified direction in the attachment target; and
a door panel length measurement step of measuring a door panel length in the specified direction of each of the door panels of the doors, which are attached to the plural openings, wherein
in the door position correction step, the door moving device corrects the relative position of the respective door to each of the plural openings so as to arrange the door at a position where a variation in a clearance between the door panel in each of the plural openings and a circumferential edge of each of the openings is minimized, and the variation in the clearance is based on the attachment target length and the door panel length of each of the door panels.

8. The door attachment method according to claim 1, wherein
in the door position correction step, the position of the door is corrected on the basis of displacement of the door in a non-operating interval, which is caused by a backlash of the door moving device.

9. The door attachment method according to claim 1, wherein
the attachment target is a vehicle body.

10. The door moving device used for the door attachment method according to claim 1, the door moving device comprising:
the grip mechanism that grips the hinge;
the door panel holding mechanism that holds the door panel; and
a moving mechanism that moves the grip mechanism and the door panel holding mechanism.

11. The door moving device according to claim 10, wherein the door panel holding mechanism has a sticking unit that sticks to an outer surface of the door panel.

12. The door moving device according to claim 11, wherein
the sticking unit is arranged to stick to a portion near a side edge on an opposite side from a side edge, to which the hinge is attached, in the door panel.

13. The door moving device according to claim 12, wherein
the plural sticking units are aligned along the side edge on the opposite side.

14. The door moving device according to claim 13, wherein
the grip mechanism is configured to be able to change a position of gripping the hinge so as to correspond to plural types of the doors with a different attachment position of the hinge to the door panel.

15. A sagging under own weight measurement device used for the door attachment method according to claim 2, the sagging under own weight measurement device comprising:
a door panel holding section that is configured to be able to hold the door panel in a standing state and discontinue holding of the door panel in the state where the grip mechanism grips the hinge; and
a door panel position measurement section that measures positions of plural portions of the door panel in each of a state where the door panel holding section holds the door panel and a state where holding of the door panel is discontinued and the grip mechanism grips the hinge to bring the door into the cantilevered state.

16. The door attachment method according to claim 5,
the attachment target having plural openings that are adjacent to each other and aligned in a specified direction, and one of the door being attached to each of the plural openings,
the method further comprising,
prior to the primary fastening step:
an attachment target length measurement step of measuring a distance between two points in the specified direction in the attachment target; and
a door panel length measurement step of measuring a door panel length in the specified direction of each of the door panels of the doors which are attached to the plural openings, wherein
in the door position correction step, the door moving device corrects the relative position of the respective door to each of the plural openings so as to arrange the door at a position where a variation in a clearance between the door panel in each of the plural openings and a circumferential edge of each of the openings is minimized, and the variation in the clearance is based on the attachment target length and the door panel length of each of the door panels.

17. The door attachment method according to claim 6,
the attachment target having plural openings that are adjacent to each other and aligned in a specified direction, and one of the door being attached to each of the plural openings,
the method further comprising,
prior to the primary fastening step:
an attachment target length measurement step of measuring a distance between two points in the specified direction in the attachment target; and a door panel length measurement step of measuring a door panel length in the specified direction of each of the door panels of the doors which are attached to the plural openings, wherein in the door position correction step, the door moving device corrects the relative position of the respective door to each of the plural openings so as to arrange the door at a position where a variation in a clearance between the door panel in each of the plural openings and a circumferential edge of each of the openings is minimized, and the variation in the clearance is based on the attachment target length and the door panel length of each of the door panels.

\* \* \* \* \*